(12) United States Patent
Hughes

(10) Patent No.: US 7,778,866 B2
(45) Date of Patent: Aug. 17, 2010

(54) SYSTEMS AND METHODS FOR SOFTWARE DEVELOPMENT

(75) Inventor: John M. Hughes, Hebron, CT (US)

(73) Assignee: Topcoder, Inc., Glastonbury, CT (US)

( * ) Notice: Subject to any disclaimer, the term of this patent is extended or adjusted under 35 U.S.C. 154(b) by 1467 days.

(21) Appl. No.: 11/035,783

(22) Filed: Jan. 14, 2005

(65) Prior Publication Data

US 2005/0160395 A1 Jul. 21, 2005

Related U.S. Application Data

(63) Continuation-in-part of application No. 10/408,402, filed on Apr. 7, 2003, now Pat. No. 7,292,990.

(60) Provisional application No. 60/536,760, filed on Jan. 15, 2004, provisional application No. 60/370,937, filed on Apr. 8, 2002.

(51) Int. Cl.
*G06F 11/34* (2006.01)
(52) U.S. Cl. ............................... 705/11; 705/9; 717/101
(58) Field of Classification Search ................ 705/1, 705/7, 8, 9, 11, 26, 27; 717/100, 101, 102, 717/168; 463/9, 40, 42
See application file for complete search history.

(56) References Cited

U.S. PATENT DOCUMENTS

| 4,525,599 A | 6/1985 | Curran et al. | ............ | 178/22.08 |
| 5,513,994 A | 5/1996 | Kershaw et al. | | |

(Continued)

FOREIGN PATENT DOCUMENTS

WO       WO 97/39811       10/1997       ..................... 24/24

OTHER PUBLICATIONS

Annavajjala, Karuna. JAVA Challenge Software Project. College of Engineering and Mineral Resources at West Virginia University, Departmentof Computer Science and ElectricalEngineering. Morgantown, West Virginia, 1999.*

(Continued)

*Primary Examiner*—Jeffrey A. Smith
*Assistant Examiner*—Adam Levine
(74) *Attorney, Agent, or Firm*—Goodwin Procter LLP

(57) ABSTRACT

This invention relates to methods and a system for developing software. In one embodiment, a method for developing software includes communicating a specification for the design of a software program to a first plurality of developers, in response to the specification, receiving a design from a subset of the developers to a subset of the developers, facilitating a design review process for scoring the designs, selecting one design based on its score, communicating the selected design to a second plurality of software developers, in response to the design, receiving software programs from a subset of the second plurality of developers, facilitating a software review process for scoring the programs, and selecting one program based on its score. In another embodiment, a method for the distributed development of software includes providing a software development system to a distributed community of developers, the system including software development software that utilizes a structured development methodology, a communication server, and a review board for determining the quality of submitted software; accepting a request to create a software program; and facilitating the development of the program by a subset of the distributed community of developers using the software development system.

28 Claims, 7 Drawing Sheets

U.S. PATENT DOCUMENTS

| | | | |
|---|---|---|---|
| 5,697,844 A | 12/1997 | Von Kohorn | |
| 5,779,549 A | 7/1998 | Walker et al. | 463/42 |
| 5,794,207 A | 8/1998 | Walker et al. | 705/23 |
| 5,823,879 A | 10/1998 | Goldberg et al. | |
| 5,827,070 A | 10/1998 | Kershaw et al. | 434/322 |
| 5,835,896 A | 11/1998 | Fisher et al. | |
| 5,862,223 A | 1/1999 | Walker et al. | |
| 5,916,024 A | 6/1999 | Von Kohorn | 463/40 |
| 5,933,811 A | 8/1999 | Angles et al. | 705/14 |
| 5,947,747 A | 9/1999 | Walker et al. | 434/354 |
| 5,963,916 A | 10/1999 | Kaplan | |
| 5,970,475 A | 10/1999 | Barnes et al. | |
| 5,987,302 A | 11/1999 | Driscoll et al. | |
| 5,995,951 A * | 11/1999 | Ferguson | 706/10 |
| 6,010,403 A | 1/2000 | Adam et al. | 463/6 |
| 6,012,984 A | 1/2000 | Roseman | |
| 6,055,511 A | 4/2000 | Luebbering et al. | |
| 6,088,679 A | 7/2000 | Barkley | |
| 6,112,049 A | 8/2000 | Sonnenfeld | 434/350 |
| 6,174,237 B1 | 1/2001 | Stephenson | |
| 6,193,610 B1 | 2/2001 | Junkin | |
| 6,224,486 B1 | 5/2001 | Walker et al. | |
| 6,264,560 B1 | 7/2001 | Goldberg et al. | 463/42 |
| 6,293,865 B1 | 9/2001 | Kelly et al. | 463/16 |
| 6,301,574 B1 | 10/2001 | Thomas et al. | 707/1 |
| 6,345,239 B1 | 2/2002 | Bowman-Amuah | 703/6 |
| 6,356,909 B1 | 3/2002 | Spencer | 707/10 |
| 6,397,197 B1 | 5/2002 | Gindlesperger | 705/37 |
| 6,408,283 B1 | 6/2002 | Alaia et al. | 705/37 |
| 6,427,132 B1 | 7/2002 | Bowman-Amuah | 702/22 |
| 6,453,038 B1 | 9/2002 | McFarlane et al. | |
| 6,513,042 B1 | 1/2003 | Anderson et al. | 707/102 |
| 6,532,448 B1 | 3/2003 | Higginson et al. | |
| 6,569,012 B2 | 5/2003 | Lydon et al. | 463/9 |
| 6,578,008 B1 | 6/2003 | Chacker | |
| 6,604,997 B2 | 8/2003 | Saidakovsky et al. | |
| 6,606,615 B1 | 8/2003 | Jennings et al. | |
| 6,631,404 B1 | 10/2003 | Philyaw | |
| 6,636,892 B1 | 10/2003 | Philyaw | |
| 6,658,642 B1 * | 12/2003 | Megiddo et al. | 717/101 |
| 6,662,194 B1 | 12/2003 | Joao | 707/104.1 |
| 6,761,631 B2 | 7/2004 | Lydon et al. | |
| 6,791,588 B1 | 9/2004 | Philyaw | |
| 6,824,462 B2 | 11/2004 | Lydon et al. | |
| 6,859,523 B1 | 2/2005 | Jilk et al. | |
| 6,895,382 B1 | 5/2005 | Srinivasan et al. | 705/7 |
| 6,915,266 B1 | 7/2005 | Saeed et al. | 705/2 |
| 6,938,048 B1 | 8/2005 | Jilk et al. | |
| 6,952,678 B2 | 10/2005 | Williams et al. | |
| 6,970,677 B2 | 11/2005 | Jongsma et al. | |
| 6,984,177 B2 | 1/2006 | Lydon et al. | |
| 6,993,496 B2 | 1/2006 | Pittelli | |
| 7,054,464 B2 | 5/2006 | Poor | |
| 7,155,400 B1 | 12/2006 | Jilk et al. | |
| 7,162,198 B2 | 1/2007 | Kuntz et al. | |
| 7,162,433 B1 | 1/2007 | Foroutan | |
| 7,207,568 B2 | 4/2007 | France et al. | |
| 7,292,990 B2 | 11/2007 | Hughes | |
| 7,300,346 B2 | 11/2007 | Lydon et al. | |
| 7,311,595 B2 | 12/2007 | Lydon et al. | |
| 7,392,285 B2 | 6/2008 | Philyaw | |
| 7,401,031 B2 | 7/2008 | Hughes | |
| 7,412,666 B2 | 8/2008 | Philyaw | |
| 7,416,488 B2 | 8/2008 | Peterson et al. | |
| 2001/0032170 A1 | 10/2001 | Sheth | |
| 2001/0032189 A1 | 10/2001 | Powell | 705/59 |
| 2001/0034631 A1 | 10/2001 | Kiselik | 705/8 |
| 2001/0037281 A1 | 11/2001 | French et al. | 705/37 |
| 2001/0039529 A1 | 11/2001 | Hoffman | 705/37 |
| 2001/0049615 A1 | 12/2001 | Wong et al. | 705/8 |
| 2001/0049648 A1 | 12/2001 | Naylor et al. | |
| 2002/0038221 A1 | 3/2002 | Tiwary et al. | |
| 2002/0077963 A1 | 6/2002 | Fujino et al. | |
| 2002/0116266 A1 | 8/2002 | Marshall | |
| 2002/0120501 A1 | 8/2002 | Bell et al. | |
| 2002/0120553 A1 | 8/2002 | Bowman-Amuah | |
| 2002/0161696 A1 | 10/2002 | Gebert | |
| 2003/0018559 A1 | 1/2003 | Chung et al. | |
| 2004/0210550 A1 | 10/2004 | Williams et al. | |
| 2006/0184384 A1 | 8/2006 | Chung et al. | |
| 2006/0248504 A1 | 11/2006 | Hughes | |
| 2007/0186230 A1 | 8/2007 | Foroutan | |
| 2009/0024457 A1 | 1/2009 | Foroutan | |

OTHER PUBLICATIONS

U.S. Appl. No. 10/377,343, filed Feb. 28, 2003, Lydon et al.

U.S. Appl. No. 10/377,344, filed Feb. 28, 2003, Lydon et al.

U.S. Appl. No. 10/378,539, filed Feb. 28, 2003, Lydon et al.

An Overview of PC2s [online], [Retrieved on Jul. 24, 2006]. Retrieved from the Internet: http://hera.ecs.csus.edu/pc2/pc2desc.html, Revised Oct. 18, 2002.

"101 Software Team" [online], [Retrieved on Jul. 24, 2006 ]. Retrieved from the Internet: http://olympiads.win.tue.nl/joi/st/.

"Ed's Programming Contest Problem Archive" [online], [Retrieved on Jul. 25, 2006]. Retrieved from the Internet: http://www.karrels.org/Ed/ACM/index.html.

"ACM/IBM Quest for Java 2000" [online], [Retrieved on Jul. 25, 2006]. Retrieved from the Internet:http://www.acm.org/jquest/.

"JavaWorld Code Masters" [online], [Retrieved on Jul. 25, 2006]. Retrieved from the Internet: http://infoart.udm.ru/it/news/src/20000052.htm.

"Hack the Web for Fun!" [online], [Retrieved on Jul. 26, 2006]. Retrieved from the Internet: http://web.archive.org/web/20000816205559/http://java.sun.com/contest/external.html.

"Brainbench the measure of achievement" [online], [Retrieved on Nov. 9, 2000], Retrieved from the Internet: http://www.brainbench.com/xml/bb/homepage.xml.

"Problem Set Archive with Online Judge" [online], [Retrieved on Jul. 26, 2006]. Retrieved from the Internet: http://acm.uva.es/problemset/.

Lewis, "Tournaments become latest high-tech recruiting tool," The Boston Globe at C1, May 6, 2002.; http://www.cs.berkeley.edu/~hilfingr/programming-contest/acm-news-05-10, 2002. txt—*Replacement text, retrieved from the Internet on Jul. 25, 2006.

Annavajjala, "JAVA Challenge Software Project" Master's Thesis submitted to the Department of Computer Science and Electrical Engineering at West Virginia University.

Astrachan, O. "The Internet Programming Contest: A Report and Philosophy" Association for Computing Machinery, Feb. 1993; Retrieved from the Internet on Jul. 25, 2006 http://www.cs.dartmouth.edu/~dfk/papers/astrachan:contest.pdf.

"URCSC Computer Programming Contest" [online], http://www.mathcs.richmond.edu/~urcsc/contest/rules2.html, Retrieved from the Internet on Jul. 25, 2006.

Blecourt, "The Legacy of Arpad Elo: The Development of a Chess Rating System" University of Amsterdam, Dec. 1, 1998.

U.S. Chess Federation [online], [Retrieved on Dec. 3, 2002]. Retrieved from the Internet: http://www.uschess.org/about/about/htmi.

Carlton, Jim. Strutting their data, geeks go to battle for bucks and glory. Wall Street Journal, Mar. 11, 1994, col. 4, pA1(W) & pA1(e), ISSN 0193-241.

Fink, William & Joyce Dick. Computer Programming Tournament as a learning Experience. The Computer Education Quarterly. Summer 1989, vol. 11, Issue 2 pp. 46-52.

O'Sullivan, Kate. "Best of the Web: Testing Recruits, Net-Style" Dec. 2000, pp. 1-5. http://pf.inc.com/magazine/20001201/21124.html, Retrieved from the Internet on Jul. 28, 2006.

Flipcode. Coding contest [online]. 2000 [retrieved on Jul. 26, 2006]. Retrieved from the Internet: http://www.flipcode.com/cgi-bin/fcarticles.cgi?show=62761.

The Eiffel Stuggle 2000, Call for participation [online]. Aug. 2000, retrieved on Jul. 28, 2006]. Retrieved from the Internet: URL: http://www.elj.com/eiffel/struggle2000/cfp/, entire document.

ICFP Functional Programming Contest, [online] 1998, [retrieved on Jul. 26, 2006]. Retrieved from the internet: URL: http://www.ai.mit.edu/extra/icfp-contest.

"About CBDi" [online], [Retrieved on Jul. 28, 2006]. Retrieved from the Internet: http://www.cbdiforum.com/public/about.php3.

"ComponentSource: About Us" [online], [Retrieved on Jul. 28, 2006]. Retrieved from the Internet: http://www.componentsource.com/services/aboutcomponentsource.asp.

"Flashline 4 Provides Software Asset Management for Enterprise Programs" [online], [Retrieved on Jul. 28, 2006]. Retrieved from the Internet: http://www.flashline.com/fcm/fcm.jsp.

"About ComponentOne" [online], [Retrieved on Jul. 28, 2006]. Retrieved from the Internet: http://www.componentone.com/Company.aspx?ItemType=1&TabTypeID=3&TabMapID=149&ItemID=0&SubCategoryTypeID=0&PanelIndex=2&TabID=176.

"Rogue Wave Corporate Information" [online], [Retrieved on Jul. 28, 2006]. Retrieved from the Internet: http://www.roguewave.com/corp/.

"LogicLibrary Company Overview" [online], [Retrieved on Jul. 28, 2006]. Retrieved from the Internet: http://www.logiclibrary.com/about_us/company_profile.php.

"/n software inc.—General Corporate Information" [online], [Retrieved on Jul. 28, 2006]. Retrieved from the Internet: http://www.nsoftware.com/company/corporateinfo.aspx.

"ILOG Corportae Profile" [online], [Retrieved on Jul. 28, 2006]. Retrieved from the Internet: http://www.ilog.com/corporate/profile/.

"What is SourceForge.net" [online], [Retrieved on Jul. 28, 2006]. Retrieved from the Internet: http://sourceforge.net/docman/display_doc.php?docid=6025&group_id=1.

"CollabNet Corporate Background" [online], [Retrieved on Jul. 28, 2006]. Retrieved from the Internet: http://www/collab.net/media/pdfs/collabnet_background.pdf.

Office Action for US Patent No. 6,569,012 dated Jun. 27, 2002.
Office Action for US Patent No. 6,569,012 dated Aug. 21, 2002.
Final Office Action for US Patent No. 6,569,012 dated Dec. 6, 2002.
Office Action for U.S. Appl. No. 10/377,343 dated Jul. 25, 2003.
Office Action for U.S. Appl. No. 10/377,344 dated Jul. 25, 2003.
International Search Report for International Patent Application Serial No. PCT/US03/10537 dated Jul. 17, 2003.
Web Pages from Slashdot.org: http:Hdevelopers.slashdot.org/developers/04/01/'26/1834209.shtml?tid=136&tid=155&tid=187&tid=99 retrieved from the Internet on Jan. 28, 2004.
Web Pages from Scwatch.net:—http://www.scwatch.net/modules.php?name=Forums&file=viewtopic&t=16 Retrieved from the Internet on Jan. 28, 2004.
"IBM Patents Method for Paying Open Source Volunteers". posted at http://www.theinquirer.net/Default.aspx?article--13813 Retrieved from the Internet on Jan. 29, 2004.
Web page www.cosource.com (Mar. 21, 2000), as provided by web.archive.org on Mar. 31, 2006 at http://web.archive.org/web/20030216031 6/www.cosource.com.
Weinrich and Altmann, "An Object-oriented Infrastructure for a Cooperative Software Development Environment", 1997, Linz, Austria.
Van Wegberg and Berends, "Competing communities of users and developers of computer software: competition between open source software and commercial software", May 2000, i, 1-13, University of Maastrict, the Netherlands.
Voas "Certifying Off-the-Shelf Software Components", Jun. 1998, 53-59, Sterling, VA.
Skaf, Charoy and Godart, "Maintaining Consistency of Cooperative Software Development Activities", Vandoeuvre-les-Nancy, France.
Ward, Donald L. "Aircraft Information Systems Support SOL 9-Bj2-Z19-1-31I DUE 061401 POC" 2 pages,Jun. 11, 2001.
Bennett, Lynda et al. "Forging an Outsourcing Partnership that Works" IPCC 94, pp. 406-410, 1994.
Dhillon, Gurprett Outsourcing of IT service Provision Issues, Concerns and Some Case Examples, 20 pages, Fall 2002.
Forsberg et al., "Managing Outsourcing of Software Development" 48 pages, Spring 2001.

Annavajjala, "JAVA Challenge Software Project" Master's Thesis submitted to the Department of Computer Science and Electrical Engineering at West Virginia University (pp. i-107).
TopCoder ("TopCoder Addresses Demand for Elite Programmers with Coding Competitions-San Francisco Collegeiate Tournament Finals Concurrent with Sun Java One EventWinners from Top U.S. Universities Will Share $250,000 in Prize Money", InternetWire, May 29, 2001).
TopCoder homepage (http://web.archive.org/web/20010516213901/http://topcoder.com/) Retrieved from the internet Oct. 19, 2006 (1 page).
The Rules of the 2001 ACM Regional Programming Contests Sep. 10, 2001, FINAL (from http://web.archive.org/web/20011224151037/icpc.baylor.edu/icpc/Regionals/About.htm) retrieved from the internet Mar. 5, 2009 (5 pages).
ICFP Programming Contest Home Page—The Third Annual ICFP Programming Contest, retrieved from the internet—http://web.archive.org/web/20000816191608/http:/www.cs.cornell.edu/icfp Mar. 5, 2009.
Programming Contest Control System (PC2) (<http://ecs.csus.edu/pc2/>, internet archive, retrieved from the internet Mar. 5, 2009) 2 pages.
Google Programming Contest, First Annual Google Programming Contest, http://web.archive.org/web/20020207103456/http://www.google.com/programming-contest/index.html (retrieved from the internet Mar. 5, 2009 , 4 Pages).
Freelance Web Designers & Freelance PHP, ASP, PERL, CGI, Programmer Marketplace, from http://rfq.programmingbids.com/cgi-bin/rfq/feedback.cgi?p=mamoon, retrieved from the internet Aug. 8, 2006 (4 pages).
Cooper, Jack et al. "Software Acquisition Capability Maturity Model (SA-CMM_Version 1.03)", Mar. 2002, CMU, Whole Manual.
http://www.programmingbids.com/, informational webpages retrieved from the Internet Nov. 29, 2001, 15 pages.
Kirsner, Scott, "The New Rules", <http://www.topcoder.com/index?t=news_events&c=article_bglobe>, downloaded from the Internet Jun. 21, 2006, 4 pages.
Phillips, Margot et al. "Programming Contests: Two Innovative Models from New Zealand", Powerpoint presentation slides printout.
Boersen, Raewyn et al. "Programming Contests: Two Innovative Models from New Zealand", text and description.
Opmanis, Martins "Possible ways to improve Olympiads in Informatics" Powerpoint presentation slides printout.
Opmanis, Martins "Possible ways to improve Olympiads in Informatics" text and description, Institute of Mathematics and Computer Science, University of Latvia, pp. 1-11.
"The Dutch Olympiad in Informatics" Powerpoint presentation slides printout.
van der Vegt, Willem, "The CodeCup, an annual game programming competition" Paper for IOI-workshop, pp. 1-11.
Dagiene, Valentina "Competition in Information Technology—learning in an attractive way", text and description, pp. 1-7.
Yakovenko, Bogdan "50% rule should be changed."pp. 1-4.
Fisher, Maryanne et al. "Gender and Programming Contests: Mitigating Exclusionary Practices" Powerpoint presentation slides printout.
Fisher, Maryanne et al. "Gender and Programming Contests: Mitigating Exclusionary Practices" text and description.
Wang, Hong et al. "Visualization, Antagonism and Opening—Towards the Future of the IOI Contest" for 1st Workshop on Computer Science Competitions Reform, Tsinghua University, Beijing, China.
Forisek, Michal "On suitability of programming competition tasks for automated testing" Powerpoint presentation slides printout, 11 pages.
Forisek, Michal "On suitability of programming competition tasks for automated testing" text and description, pp. 1-9.
Cormack, Gordon et al. "Structure, Scoring and Purpose of Computing Competition", text and description, University of Waterloo.
Cormack, Gordon et al. "Structure, Scoring and Purpose of Computing Competition" Powerpoint presentation slides printout, 10 pages.

Cormack, Gord et al. "Structure, Scoring and Purpose of Computing Competition (Part 2)" Powerpoint presentation slides printout, 25 pages.
Pohl, Wolfgang, Suggestions for CS Competitions (Task, Exam, Automatic Grading) Powerpoint presentation slides printout, 7 pages, Dagstuhl, Germany, Jan. 24, 2006.
Pohl, Wolfgang, "Classification of Computer Science Competitions" Powerpoint presentation slides printout, 7 pages, Dagstuhl, Germany, Jan. 23, 2006.
Pohl, Wolfgang, "Computer Science Competitions for High School Students—Approaches to Classification and New Task Types", text and description, 8 pages.
Pohl, Wolfgang, "Computer Science Competitions for High School Students—Approaches to Classification and New Task Types", Extended Abstract, 7 pages.
Manzoor, Shahriar "Analyzing Programming Contest Statistics" (<http://online-judge.uva.es/contest/>) Southeast University, Dhaka, Bangladesh.
Manzoor, Shahriar "Analyzing Programming Contest Statistics" (<http://online-judge.uva.es/p>) Southeast University, Dhaka, Bangladesh.
Verhoeff, Tom "The IOI Is (Not) a Science Olympiad", Powerpoint presentation slides printout, Jan. 24, 2006, The Netherlands.
Verhoeff, Tom "The IOI Is (Not) a Science Olympiad", text and description, Oct. 2005, The Netherlands, 9 pages.
Michalski, Marcin et al. "Plug & Play Contest System" (SIO.NET), Basic guidelines sheet, Institute of Informatics, Warsaw University, Poland.
Michalski, Marcin et al. "Plug & Play Contest System" (SIO.NET), text and description, Institute of Informatics, Warsaw University, Poland.
Cormack, Gordon "Random Factors in IOI Test Case Selection" text and description, University of Waterloo, Ontario, Canada.
Cormack, Gordon, "Statistical Analysis of IOI Scoring" Brief description.
Cormack, Gordon "Statistical Analysis of IOI Scoring" Powerpoint presentation slides printout, Jan. 24, 2006.
Retrieved from the Internet, http://www.bwinf.de/competition-workshop/ information sheet, Jul. 12, 2006.
Retrieved from the Internet, http://www.bwinf.de/competition-workshop/papers.html, listing of accepted papers, Jul. 12, 2006.
1999 ICFP Programming Contest, [online] 1999, [retrieved on Jul. 28, 2006]. Retrieved from the internet: URL: http://wwwcs.virginia.ed/-18 jks6b/ocfp/.

* cited by examiner

| 502 PROGRAM 1 | 502' PROGRAM 2 | ... | 502" PROGRAM n |
| --- | --- | --- | --- |
| # — 604 | # | | # |
| # | # | | # |
| # | # | | # |
| # | # | | # |
| # | # | | # |
| # | # | | # |
| SCORE $P_1$  — 608 | SCORE $P_2$ | | SCORE $P_n$ |

TEST CASE 1A, TEST CASE 1B, TEST CASE 2A, TEST CASE 2B, TEST CASE nA, TEST CASE nB — 508

SCORE

FIG. 6

SYSTEMS AND METHODS FOR SOFTWARE DEVELOPMENT

CROSS-REFERENCE TO RELATED APPLICATIONS

This application claims priority to U.S. provisional patent application Ser. No. 60/536,760, filed Jan. 15, 2004, and is a continuation in part of U.S. patent application Ser. No. 10/408,402, filed Apr. 7, 2003, which claims priority to U.S. provisional patent application Ser. No. 60/370,937, filed Apr. 8, 2002.

TECHNICAL FIELD

This invention relates to computer-based methods and systems for developing and distributing software and, more particularly, to methods and systems facilitating the distributed development of software.

BACKGROUND INFORMATION

In the United States and elsewhere, computers have become part of people's everyday lives, both in the workplace and in personal endeavors. This is because a general-purpose computer can be programmed to run a variety of software programs each providing different processing and networking functions. Computer programmers develop computer code. Some companies hire large numbers of computer programmers to develop code on the company's behalf.

One approach is to hire large numbers of programmers and develop software "in house." While this affords significant control over the programming staff, finding, hiring, and maintaining such a staff can be cost prohibitive. Furthermore, as individual programmers leave the company, much of the technical and industrial knowledge is also lost. Alternatively, many companies "outsource" their programming through consulting firms, or contract employees. This approach relieves the company of the burdens of managing individual employees, however the quality and consistency of the work may be suspect, and the challenges of integrating work from numerous outside vendors can be significant.

SUMMARY OF THE INVENTION

Organizations need to obtain high-quality software while being assured that the code is developed using appropriate quality measures. Techniques that have been suggested to improve software development are code re-use and component-based design. But even if organizations adopt such techniques, they still need to obtain high-quality components in an affordable manner.

In general, the invention relates to providing infrastructure, process controls, and manpower to develop software using a repeatable, structured model in order to transform software development from an ad-hoc, custom development exercise into a streamlined, predictable manufacturing operation. Generally speaking, this goal can be achieved, in one exemplary implementation, by separating the software design functions from the software development functions, providing rigorous review processes, and using a competition model whereby a number of distributed, unrelated, and motivated developers submit multiple software designs or programs, from which the eventual software design or program is selected.

Furthermore, software development firms can be employed to perform only a portion of an entire process. For example, a consulting firm may be hired to develop a functional specification for an application addressing a certain business need, or an offshore programming shop engaged to build software according to the specification. A multi-step software development manufacturing process that has well-defined inputs and outputs at each step, meets stringent quality control requirements, and catalogs each process output as a subassembly component of the larger product, allows such flexibility without sacrificing quality. Such a process can be entered (or exited) at various points, while the independence of the developers allows for enforcement of rigorous design and quality analysis without "office politics" or other favoritism, which in turn results in very high quality (e.g., enterprise quality) software.

In one aspect, a specification for the design of a software program such as a component, an application, a module, or a library is communicated to a first plurality of developers, who in some cases may be geographically distributed. In response, designs, which may or may not include such items as one or more of a requirements document, an activity diagram, a case document, test cases, a prototype, or a UML document for the software program are received from a subset of the plurality of developers. A design review process for review of the received designs is facilitated, and based at least in part on the results, one design is selected. The selected design is communicated to a second plurality of software developers (who in some cases may be different than the first plurality of software developers), and in response to the communicated design, a software program, which in some cases may comprise source code, object code, or compiled code, is received from each of the second plurality of software developers. A software review process is facilitated for reviewing each of the received programs, and one program is selected based at least in part on its review.

Various embodiments can include one or more of the following features. Developers' skill ratings can be derived from the developer's performances in one or more coding competitions, which (in whole or in part) can be held online. For example, the first plurality of software developers can be selected based, at least in part, on having achieved a minimum rating received in the one or more competitions. The ratings assigned to a developer can be derived (in whole or in part) from the score associated with one or more designs or programs. A difficulty level can be associated with the software program, and in some embodiments, the developers can be rated based, at least in part, on the difficulty level associated with the design or program.

Prior to communicating the specification, a portion of the specification can be received from an entity requesting the development of a software program. In some cases, the specification can be communicated using an on-line application, using, for example, the Internet. The method can further include rewarding the software developer that submitted the selected design or program with, for example, monetary rewards and/or increased skill ratings.

The design review and/or software review processes can be performed by a plurality of reviewers, who in some cases may have been previously rated in a computer programming competition, and may have achieved a rating above a predetermined minimum rating. Where a plurality of reviewers participate in the design review or software review, the design and/or software review process can include aggregating scores from each of the plurality of reviewers into a summary rating, and the selection of one design or program can be based on the summary score. The design review process can include one or more activities such as reading design documents, completing a review form, which in some cases my be an on-line form, and identifying changes to be incorporated into the design by the software developer who submitted the design. The changes can be designated as mandatory or optional at the discretion of the reviewer. In some embodiments, an appeal can be made contesting the score assigned to a software developer's design and/or program. A selected program can be distributed, and in some cases support for the distributed program may be provided.

In general, another aspect of the invention relates to a method of distributed software development. The method includes providing a software development system to a distributed community of software developers, accepting a request to create a software program from an entity, and facilitating the development of the software program by at least a subset of the community of software developers using the software development system. The software development system provided to the developers includes software development software that facilitates the development and testing of software programs using a structured development methodology, which in some cases may include multiple phases such as a specification phase, a design phase, a development phase, a testing phase, and a support phase; a communication server in communication with the software development software for delivering the software development software to a distributed community of software developers; and a review board comprising one or more programmers capable of determining the quality of software developed by the distributed community of software developers.

Various embodiments optionally can include one or more of the following features. The software programs can be programs selected from the group of components, applications, modules and libraries. In some embodiments, the software developers can be rated based on their participation in one or more coding competitions or the designs and code that they develop. To facilitate the distributed nature of the development process, one or more components of the software development system can be geographically distributed, and the distribution can be effected using the Internet or other networks. As one non-limiting example, the client software used by programmers to develop computer code can be in the form of a downloadable applet (i.e., a java applet).

The review board can include programmers that were previously rated, for example, in a coding competition or by rating the designs and/or code that they have developed. The quality of the software can be determined by the review board by reviewing such items as design documents, source code, object code, compiled code, class definitions, and methods. The development environment can facilitate the development of such items as design models (e.g., UML models), case models, and computer code, as well as the compilation and testing of computer code. The method can also include receiving developed software programs from a subset of the community of software developers, and in some cases selecting one or more of the received programs to be delivered to the entity. The developers that submitted the one or more selected software programs may be compensated, in some cases with money, and in some cases by an increased skill rating.

In another aspect, the invention provides a computerized method for evaluating software programs. The method includes communicating requirements for the development of a software program to a population of software developers, and in response, receiving from each of a subset of the population of software developers a candidate software program and one or more test cases for testing the received candidate software program. The method also includes testing each of the received software programs using test cases received from two or more of the subset of the population of software developers, and scoring the received candidate software programs based at least in part on the results of the testing.

Embodiments can include one or more of the following features. The software developers can be geographically distributed, and in some cases may have been rated in one or more coding competitions. The candidate software programs can include source code, object code, compiled code, class definitions, methods, applications, and components. The submitted test cases can include sample data to be used as input for the candidate software program.

In yet another aspect, the invention relates to systems for implementing the methods just described. For example, a system for evaluating the functionality of software programs includes a communications server for communicating requirements for the development of a software program to a population of software developers, and in response, receiving from each of a subset of the developers a candidate software program and one or more test cases for testing the received program, a testing server for testing each of the received software programs using test cases received from two or more of the subset of software developers, and a scoring server in communication with the testing server for scoring the received candidate software programs based at least in part on test results received from the testing server.

In one embodiment of this aspect of the invention, the software developers can be geographically distributed, and in some cases the developers may have been previously rated. The received candidate software programs can include source code, object code, compiled code, class definitions, methods, applications, or components, and the submitted test cases can include sample data to be used as input for the candidate software program.

Other aspects and advantages of the invention will become apparent from the following drawings, detailed description, and claims, all of which illustrate the principles of the invention, by way of example only.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 6 is a more detailed diagram of an embodiment of a testing environment such as that shown in FIG. 5.

DETAILED DESCRIPTION

Figure 1:
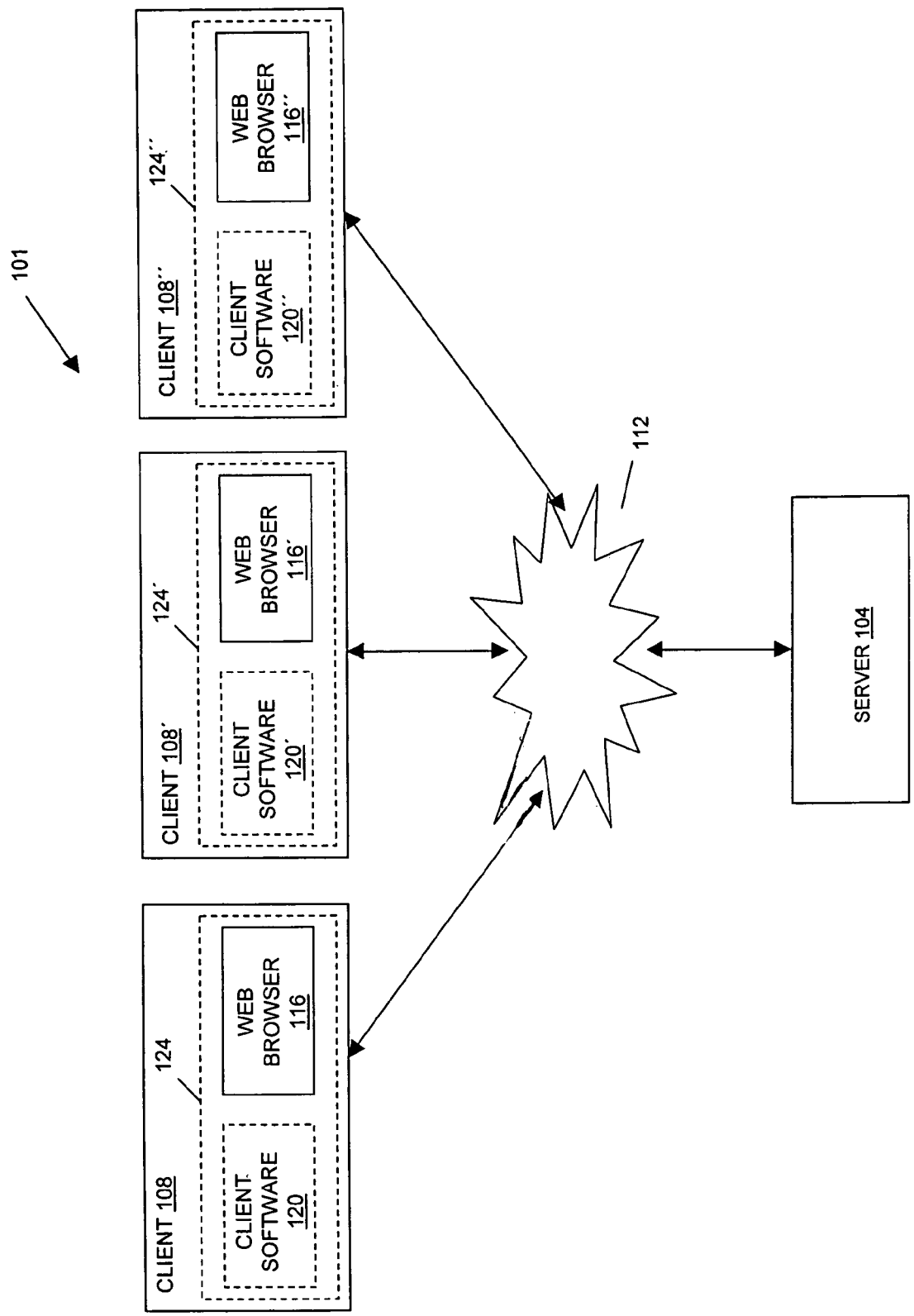
FIG. 1 is a block diagram of an embodiment of a distributed software development system having a server according to the invention.

Referring to FIG. 1, in one embodiment, a distributed software development system 101 includes at least one server 104, and at least one client 108, 108', 108", generally 108. As shown, the distributed software development system includes three clients 108, 108', 108", but this is only for exemplary purposes, and it is intended that there can be any number of clients 108. The client 108 is preferably implemented as software running on a personal computer (e.g., a PC with an INTEL processor or an APPLE MACINTOSH) capable of running such operating systems as the MICROSOFT WINDOWS family of operating systems from Microsoft Corporation of Redmond, Wash., the MACINTOSH operating system from Apple Computer of Cupertino, Calif., and various varieties of Unix, such as SUN SOLARIS from SUN MICROSYSTEMS, and GNU/Linux from RED HAT, INC. of Durham, N.C. (and others). The client 108 could also be implemented on such hardware as a smart or dumb terminal, network computer, wireless device, wireless telephone, information appliance, workstation, minicomputer, mainframe computer, or other computing device, that is operated as a general purpose computer, or a special purpose hardware device used solely for serving as a client 108 in the distributed software development system.

Generally, in some embodiments, clients 108 can be operated and used by software developers to participate in various software development activities. Examples of software development activities include, but are not limited to software development projects, software design projects, testing software programs, creating and/or editing documentation, participating in programming contests, as well as others. Clients 108 can also be operated by entities who have requested that the software developers develop software (e.g., customers). The customers may use the clients 108 to review software developed by the software developers, post specifications for the development of software programs, test software modules, view information about the developers, as well as other activities described herein. The clients 108 may also be operated by a facilitator, acting as an intermediary between the customers and the software developers.

In various embodiments, the client computer 108 includes a web browser 116, client software 120, or both. The web browser 116 allows the client 108 to request a web page or other downloadable program, applet, or document (e.g., from the server 104) with a web page request. One example of a web page is a data file that includes computer executable or interpretable information, graphics, sound, text, and/or video, that can be displayed, executed, played, processed, streamed, and/or stored and that can contain links, or pointers, to other web pages. In one embodiment, a user of the client 108 manually requests a web page from the server 104. Alternatively, the client 108 automatically makes requests with the web browser 116. Examples of commercially available web browser software 116 are INTERNET EXPLORER, offered by Microsoft Corporation, NETSCAPE NAVIGATOR, offered by AOL/Time Warner, or FIREFOX offered the Mozilla Foundation.

In some embodiments, the client 108 also includes client software 120. The client software 120 provides functionality to the client 108 that allows a software developer to participate, supervise, facilitate, or observe software development activities described above. The client software 120 may be implemented in various forms, for example, it may be in the form of a Java applet that is downloaded to the client 108 and runs in conjunction with the web browser 116, or the client software 120 may be in the form of a standalone application, implemented in a multi-platform language such as Java or in native processor executable code. In one embodiment, if executing on the client 108, the client software 120 opens a network connection to the server 104 over the communications network 112 and communicates via that connection to the server 104. The client software 120 and the web browser 116 may be part of a single client-server interface 124; for example, the client software can be implemented as a "plug-in" to the web browser 116.

A communications network 112 connects the client 108 with the server 104. The communication may take place via any media such as standard telephone lines, LAN or WAN links (e.g., T1, T3, 56 kb, X.25), broadband connections (ISDN, Frame Relay, ATM), wireless links (802.11, bluetooth, etc.), and so on. Preferably, the network 112 can carry TCP/IP protocol communications, and HTTP/HTTPS requests made by the web browser 116 and the connection between the client software 120 and the server 104 can be communicated over such TCP/IP networks. The type of network is not a limitation, however, and any suitable network may be used. Non-limiting examples of networks that can serve as or be part of the communications network 112 include a wireless or wired ethernet-based intranet, a local or wide-area network (LAN or WAN), and/or the global communications network known as the Internet, which may accommodate many different communications media and protocols.

The servers 104 interact with clients 108. The server 104 is preferably implemented on one or more server class computers that have sufficient memory, data storage, and processing power and that run a server class operating system (e.g., SUN Solaris, GNU/Linux, and the MICROSOFT WINDOWS family of operating systems). Other types of system hardware and software than that described herein may also be used, depending on the capacity of the device and the number of users and the size of the user base. For example, the server 104 may be or may be part of a logical group of one or more servers such as a server farm or server network. As another example, there could be multiple servers 104 that may be associated or connected with each other, or multiple servers could operate independently, but with shared data. In a further embodiment and as is typical in large-scale systems, application software could be implemented in components, with different components running on different server computers, on the same server, or some combination.

In some embodiments, the server 104 also can include a contest server, such as described in U.S. Pat. Nos. 6,569,012 and 6,761,631, entitled "Systems and Methods for Coding Competitions" and "Apparatus and System for Facilitating Online Coding Competitions" respectively, both by Lydon et al, and incorporated by reference in their entirety herein.

In one embodiment, the server 104 and clients 108 enable the distributed software development of a software program by one or more developers, which developers may or may not be associated with the entity requesting the development of the software program. The software program can be any sort of instructions for a machine, including, for example, without limitation, a component, a class, a library, an application, an applet, a script, a logic table, a data block, or any combination or collection of one or more of any one or more of these.

In one embodiment, the software program is a software component. Generally, a software component is a functional software module that may be a reusable building block of an application. A component can have any function or functionality. Just as a few examples, software components may include, but are not limited to, such components as graphical user interface tools, a small interest calculator, an interface to a database manager, calculations for actuarial tables, a DNA search function, an interface to a manufacturing numerical control machine for the purpose of machining manufactured parts, a public/private key encryption algorithm, and functions for login and communication with a host application (e.g., insurance adjustment and point of sale (POS) product tracking). In some embodiments, components communicate with each other for needed services (e.g., over the communications network 112). A specific example of a component is a JavaBean, which is a component written in the Java programming language. A component can also be written in any other language, including without limitation Visual Basic, C++, Java, and C#.

In one embodiment, the software program is an application. The application may be comprised of one or more software components. In one embodiment, the software application is comprised of software components previously developed using the methods described herein. In some embodiments, the application comprises entirely new software programs. In some embodiments, the application comprises a combination of new software programs and previously developed software programs.

Figure 2:
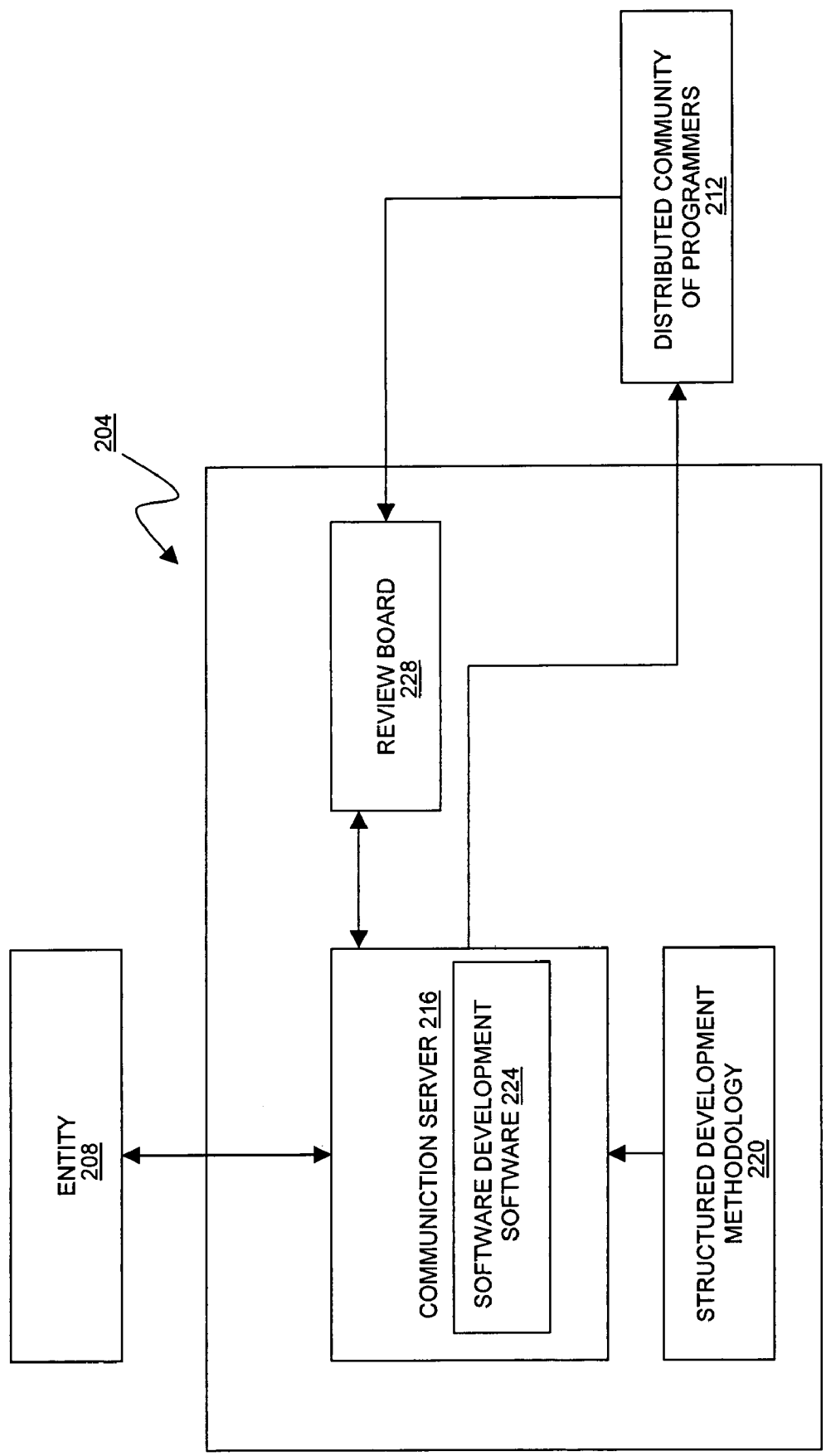
FIG. 2 is a block diagram of one embodiment of a software development domain according to an embodiment of the invention.

Referring to FIG. 2, a software development domain 204 can be used to provide an entity 208 with high-quality software. One or more developers can be identified and/or selected by various methods from a distributed community of programmers 212, and subsequently used to develop software components. For example, the developers can be employees of, consultants to, or members of an organization, enterprise, or a community fostering collaborative computer programming and distributed software development, and in some cases the developers may have no other formal or informal relationship to each other. In some embodiments, one or more of the developers can act as a product manager who is responsible for organizing and coordinating the efforts of other developers. The product manager may also specify items such as, without limitation, the cost of the project, the project schedule, and the project risks. In one embodiment, the product manager creates a project plan for the project, which may include, without limitation, an estimated project cost and schedule, and a requirements document describing, for example, the scope and risks of the project.

In some embodiments, the developers may include architects, designers, programmers, quality assurance engineers, as well as other software development roles as described in co-pending U.S. patent application Ser. No. 10/408,402, entitled "Method and Systems for Software Development" by Hughes, and incorporated by reference in its entirety herein.

In one embodiment, the software development domain 204 includes a communication server 216, one or more structured development methodologies 220, software development software 224, and a review board 228. The communication server provides a conduit through which the external entity 208, the community of programmers 212, and the review board 228 can interact, for example, to provide documentation, submit software, elicit and offer feedback, review submitted software, and potentially rate submitted software, either in design or functional form. In some embodiments, the communication server is or operates as part of the server 104 as described above, whereas in other cases the communication server may be a separate server, which may be operated by and/or outsourced to an application service provider (ASP), internet service provider (ISP), or other third-party.

The structured development methodology 220 provides a framework for the development of software programs. The methodology 220 specifies a common vocabulary, a fixed set of deliverables, development phases or steps, inputs and outputs for one or more of the steps, as well as other aspects of the development process. For example, the methodology 220 bifurcates the development process into an architecture and design phase and a development and testing phase. Furthermore, in this particular non-limiting example, the outputs of the architecture and design phase, such as class diagrams, test cases, technical specifications, and other design documents, are submitted, reviewed, and finalized prior to initiating any development work. Once a set of design documents are selected and approved, the design documents are used as input into the development phase. During the development and testing phase, the developer(s) create source code, scripts, documentation, and other deliverables based on the design documents. By assuring the high-quality of the design documents prior to beginning development, the developers are afforded a complete and accurate representation of what it is they are being asked to develop. Furthermore, by using a structured methodology, the participants, (e.g., developers 212, the entity 208) can communicate effectively, and the outputs of each process step are known and can be verified. By providing a common definition, and a known set of inputs, such as use cases, and a known set of outputs such as expected results, and facilitating community-based development, the developers can interact with each other effectively and efficiently, thus reducing the cost and time necessary to produce quality software.

The software development software 224 provides an operational mechanism for implementing the methodology 220, and a software development environment in which the developers can do one or more of develop, test, submit, and verify software designs and software programs. In some embodiments, as shown, components of the software 224 may reside on the server 104, whereas some components may be included in client software residing on a client, e.g., as described above. The software development software 224 optionally can include one or more such as a development library, from which developers can access previously developed components and documentation templates; a documentation feature that provides information about programming terms, syntax, and functions; a compiler that also allows a developer to identify and correct programming errors; and even version control and code management functions.

Figure 3:
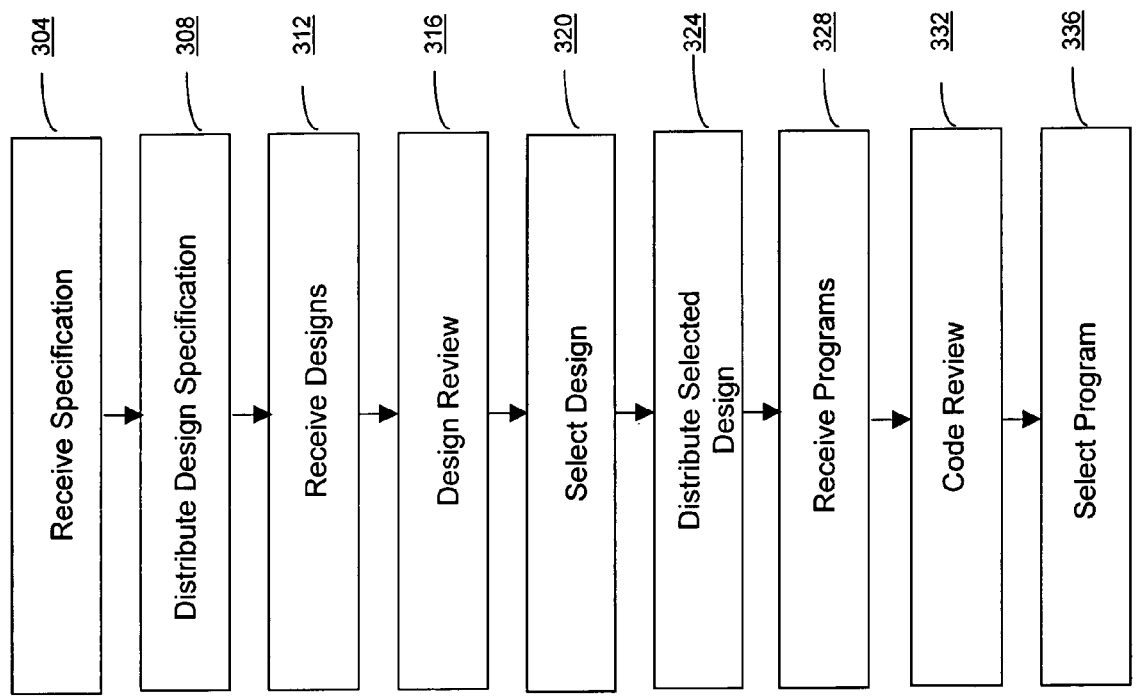
FIG. 3 is a flow chart depicting steps performed in developing a software program according to an embodiment of the invention.

FIG. 3 provides a summary illustration of one embodiment of a method for developing software, for example, using the software development domain 204 described above. The communication server 216 receives a specification (STEP 304) describing the desired functions of a software program, which is then distributed to the distributed community of programmers 212 (STEP 308). One or more of the programmers in the community 212 creates a design detailing the technical aspects of the program based on the functionality described in the specification, and once completed, the design(s) are received at the server 104 (STEP 312). The submitted design(s) are then subject to a design review process (STEP 316) whereby the design(s) are compared to the specification, and evaluated on their implementation of the specified functionality and compliance with the structured development methodology 220. A design that is the "best" of the submissions may be selected in response to the evaluations (STEP 320), and if there is at least one submission of sufficient quality, the selected design may be made available to the distributed community of programmers 212 (STEP 324). Each of a number of programmers (or, in some cases, each of teams of programmers) submits a software program that they believe conforms to the design and the requirements of the structured development methodology 220. The software programs are received at the server 104 (STEP 328) and the programs are subjected to a software review process (STEP 332) to determine which submitted program(s) best conform to the distributed design and the structured development methodology 220. Once reviewed, one (or in some cases more than one, or none if none are of sufficient quality) program is identified as a "winning" submission (STEP 336).

Figure 4:
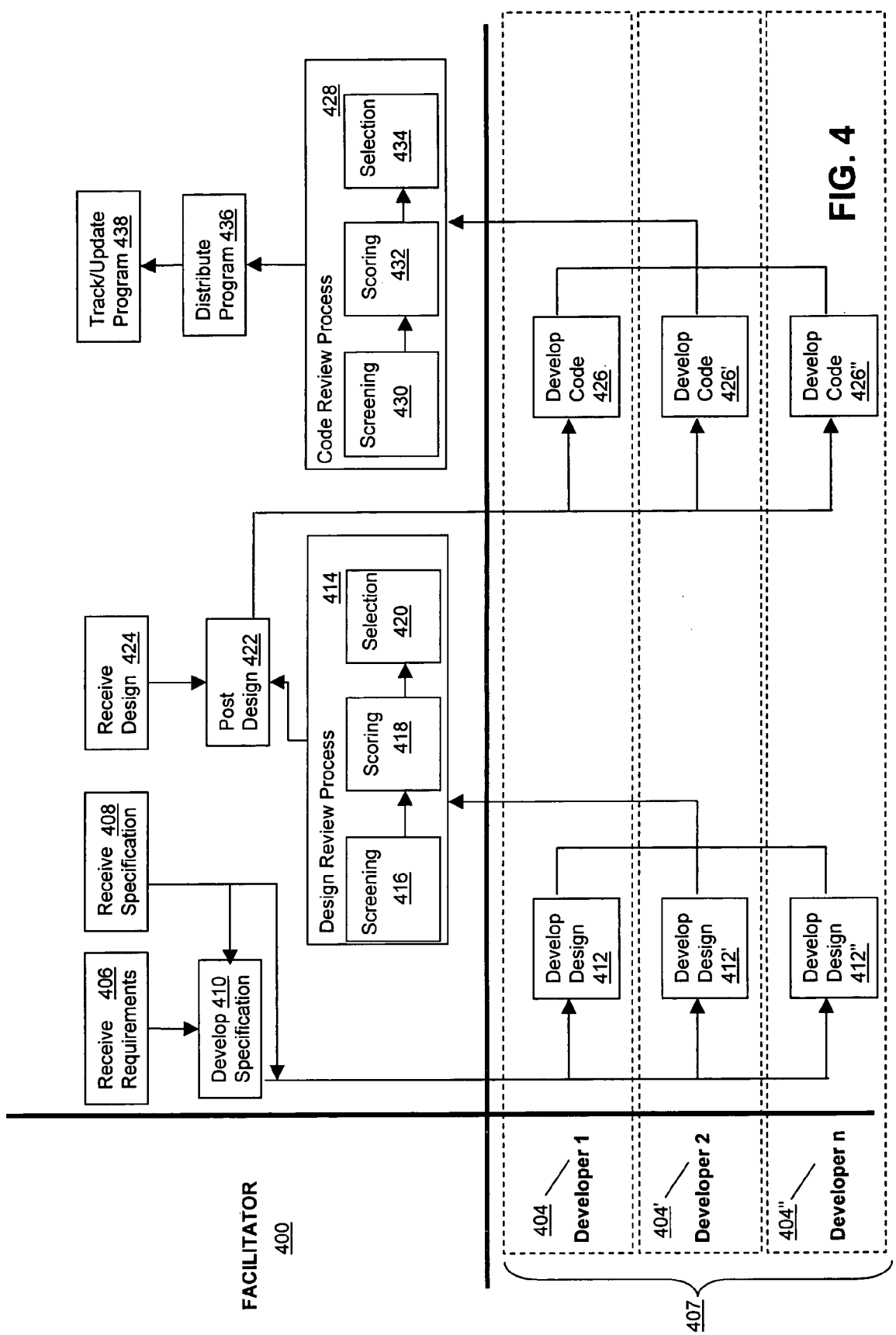
FIG. 4 is a flow chart depicting an overview of the operation of an embodiment of the invention.

FIG. 4 provides one possible implementation of the general method described above. In some such embodiments, the development process is monitored and managed by a facilitator 400. The facilitator 400 can be any individual, group, or entity capable of performing the functions described here. In some cases, the facilitator 400 can be selected from the distributed community of developers 208 based on, for example, achieving exemplary scores on previously submitted software designs and/or programs, or achieving a high ranking in a software programming contest. In other cases, the facilitator 400 can be appointed or supplied by the entity (e.g., entity 208) requesting the development of the software program, and thus oversee the design and development process for further assurance that the end product will comport with the specifications.

Initially, the facilitator 400 receives input from an entity (not shown) wishing to have a software program, application, component, or other asset developed on their behalf. The entity can be a company looking to have one or more computer programs designed and/or developed for internal use, or as portions of larger applications that they intend to sell commercially. In some cases, the entity provides a detailed specification, and in other cases only a list of functional requirements may be provided. The facilitator receives either the requirements (STEP 406), the specification (STEP 408), or in some cases both from the external entity. If, however, no specification is provided, or of the specification needs revisions to conform to the methodology, the facilitator can develop a specification in accordance with the requirements (STEP 410). In some cases, one or more members of the development community 407 (e.g., development community 212 in FIG. 2) may be asked to develop the specification, and in some cases multiple specifications may be submitted, with one of the submissions selected as the final specification to be used for guiding the design and development efforts.

In one embodiment, the specification defines the business plan and a stable hardware and/or software platform, or other architectural constraints. For example, the specification can define the network devices, servers, and general infrastructure to support the development and production of the project and product. The specification can also identify a language or tools that the component must be programmed in or with, a functional overview of the software component, boundary conditions, efficiency requirements, computer platform/environment requirements, interface requirements, performance criteria, test-case requirements, and/or documentation requirements of the component. In some embodiments, the specification can include an amount of money that will be paid to the designer who submits the best design and/or program that complies with the specification.

In some cases, the specification is assigned a difficulty level, or some similar indication of how difficult the facilitator, entity, or other evaluator of the specification, believes it will be to produce a comprehensive design according to the specification. The difficulty level may, in some cases, also be based on the effort believed to be necessary to complete the task, and the time allotted to complete the task. The difficulty level may be expressed in any suitable manner, for example as a numerical measure (e.g., a scale of 1 to 10), a letter grade, or a descriptive such as easy, medium, or hard. For example, a specification for the design of a complex gene-sequencing algorithm may have a difficulty level of 9 on a scale of 1 to 10, whereas a simple component that performs a search for specific text in a file may be assigned a difficulty level of 2. If there are additional practical constraints, for example if the search component is needed in two days, the difficulty level optionally may be increased due to the tight time constraints. In some embodiments, an award to the designer (e.g., money, skill rating, etc.) that submits the selected design may be produced or adjusted based in part on the difficulty level associated with the specification.

Once the specification is received (or developed), the facilitator 400 (or in some cases a project manager) reviews the specification to determine if it meets the requirements for a complete specification according to the development methodology 220. The methodology can include best-practice activities, templates, guidelines, and standards that assist software architects, programmers, and developers in producing quality code in a consistent and efficient manner. The use of such a methodology reduces the need to rethink and recreate programming documentation and constructs, thus reducing project duration, cost, and increasing quality and component reusability.

Once complete, the specification is distributed via the communications server 212 to one or more developers 404, 404', 404" (generally, 404), who may be members, for example, of a distributed community of programmers such as the community 212 shown in FIG. 2. In one non-limiting example, the developers 404 are unrelated to each other. For example, the developers may have no common employer, may be geographically dispersed throughout the world, and in some cases have not previously interacted with each other. However, as members of the community 212, the developers 404 may have participated in one or more competitions, and/or have had previously submitted software artifacts subject to reviews. This approach allows an entity 208 to gain access to a large pool of qualified software developers.

The communication can occur over a communications network such as the network 112 (FIG. 1), such as via an email, instant message, text message, a posting on a web page accessible by the web browser 116, through a news group, facsimile, or any other suitable communication. In some embodiments, the communication of the specification can be accompanied by an indication of a prize, payment, or other recognition that is available to the designer(s) that submit selected software design(s). In some cases, the amount and/or type of payment may change over time, or as the number of participants increases or decreases, or both. In some cases multiple designers may be rewarded with different amounts, for example a larger reward for the best design, and a smaller reward for second place. The number of designers receiving an award can be based on, for example, the number of designers participating in the design project, or other similar attributes.

The recipients of the specification can be selected by various means. In some embodiments, members of the community may have expressed interest in participating in a development project, whereas in some cases the individuals are selected based on previous performances in coding competitions, prior development projects, or other methods of measuring the programming skill of a software developer. For example, the members of the distributed community of programmers may be programmers who have previously participated in an on-line programming competition. In such a case, the programming skills of the participants may have been rated according to their performance, either individually, as a team, or in relation to other programmers, and the ratings may be used to determine which programmers are eligible to receive notification of a new specification or respond to a notification.

In one embodiment, the facilitator 400 moderates a collaborative forum among the various participants (the external entity 208, the developers 404, etc.) to determine, discuss, or collaborate on design features. The collaborative forum can consist of developers, customers, prospective customers, or others interested in the development of certain software. In one embodiment, the collaboration forum is an online forum where participants can post ideas, questions, suggestions, or other information. In some embodiments, only a subset of the forum members can post suggestions to the forum.

Upon receipt of the specification, one or more developers 404 each develop software designs (STEPS 412, 412' and 412") in accordance with the specification. The development of the software design can be done using any suitable development system, for example, the software development software 224 provided via the communication server 216, a development environment provided by the developer 404, or some combination thereof. Once a developer 404 is satisfied that her design meets the specified requirements, and follows the structured development methodology 220, she submits her design e.g., via the communications server 216, facsimile, email, mail, or other similar methods.

To determine which design will be used as the design for the software program, a design review process (STEP 414) is used. This design review can take place in any number of ways. In some cases, the facilitator 400 can delegate the review process to one or more members of the distributed community of programmers, or an appointee of the entity. The design review process, in some embodiments, includes one or more developers 404 acting as a design review board to review design submissions from software designers. The design review board preferably has a small number of (e.g., less than ten) members, for example, three members, but can be any number. Generally, the review board is formed for only one or a small number of related projects, for example three projects. Review boards, in some embodiments, could be formed for an extended time, but changes in staffing also can help maintain quality.

Preferably, one member of the design review board members is selected as the primary review board member by the facilitator 400 and/or the project manager, the members of the review board, and/or the external entity requesting the software program. In some cases, the facilitator 400 or a representative of the facilitator 400 acts as the primary review board member. The primary review board member is responsible for coordination and management of the activities of the board.

In one embodiment, submissions for software designs are judged by the design review board. In some embodiments, the primary review board member screens the design submissions before they are reviewed by the other members of the design review board, to allow the rest of the review board to judge only the best of the submissions. In some embodiments, the screening process includes scoring the submissions based on the degree to which they meet formal requirements outlined in the specification (e.g., format and elements submitted). In some embodiments, scores are documented using a scorecard, which can be a document, spreadsheet, online form, database, or other electronic document. The design review board may also, in some cases, verify the anonymity of the developers 404 such that their identities cannot be discerned from their submissions.

A screening review can determine whether the required elements of the design are included (e.g., class, use-case, and sequence diagrams, component specification, required algorithms, class stubs, and functional tests). The screening review can also determine that these elements appear complete. With regard to the class diagram, for example, and in particular the class definition, the screening review can determine any or all of that: (1) the class definition provides a descriptive overview of the class usage, (2) sub-packages have been created to separate functionality, (3) class scope matches class usage, (4) there is proper and effective use of programming techniques such as inheritance and abstraction, (5) interfaces are used properly, (6) suitable constructors are defined for the component, and that (7) class modifiers such as final and static, are appropriately used. The screening review can also determine, for example, with regard to variable definitions, that: (1) variable scope is correctly defined, (2) type assignments are defined appropriately for balance between efficiency and flexibility, and (3) that all variables are defined with an initial value. Further, with regard to method definitions, for example, the screening review can determine that: (1) scope is correctly defined, (2) exceptions are handled and used appropriately, (3) modifiers are properly used, (4) return types are used, (5) method arguments are properly defined, and (6) that the application programming interface (API) as stated in the requirements specification is available.

The screening review can also, for example, verify that use-case diagrams exist for all public methods in the design, and that sequence diagrams exist for each use case. The screening review can also, for example, with regard to test cases, verify that functional test cases are provided for each sequence diagram, and that they appear to be appropriate for those diagrams. The designs can take a number of forms, depending on the program specified. Typically, the specifications will include the requirements for the design. In one embodiment, the design requirements include class diagrams, which can be developed in the Unified Modeling Language (UML), for example using the Poseideon Computer Aided Software Engineering (CASE) tool, available from Gentleware AG of Hamburg, Germany. The design requirements also include use-case diagrams and sequence diagrams. The design requirements also include a written component design specification describing the design, a list of required algorithms, and class stubs for the classes in the design. The design requirements also include functional tests that can be used to test the program. In one such embodiment, the functional tests are tests compatible with the JUnit testing infrastructure. JUnit is open source software for testing Java software, which is available from www.sourceforge.net.

In one embodiment, the primary review board member informs the design review board that one or more submissions have passed the initial screening process (STEP 416), and the design review board then evaluates the design submissions in greater detail. In some embodiments, the design review board reviews the submissions based on requirements documented in the specification. In some embodiments, the design review board scores the submissions (STEP 418). In some embodiments, the scores are documented using a scorecard, which can be any form, including a document, spreadsheet, online form, database, or other electronic document.

In some embodiments, the scores and reviews from the primary review board member and the other members of the design review board are aggregated into a final review and score. In some embodiments, the aggregation can comprise compiling information contained in one or more documents. Such aggregation can be performed by the primary review board member, the other members of the design review board, or in one exemplary embodiment, the aggregation is performed using a computer-based system which resides on the server 104 (FIG. 1). In some embodiments, the facilitator 400 or the primary review board member resolves discrepancies or disagreements among the members of the design review board.

In one embodiment, the design with the highest combined score is selected as the winning design that will be used for implementation (STEP 420). A prize, payment and/or recognition is given to the designer. In one embodiment, a portion of the payment to the designer is withheld until the end of the development review. For example, the designer may receive 75% of the payment and the end of the design review, and 25% is paid after the code review. There can also be prizes, payments, and/or recognition for the other submitted designs. For example, the designers that submit the second and third best designs may also receive payment, which in some cases may be less than that of the winning designer. Payments may also be made for creative use of technology, submitting a unique test case, or other such submissions. In some embodiments, the software developers can contest the score assigned to their design, program, or other submissions.

In some cases, the posted design is assigned a difficulty level, or some similar indication of how difficult the external entity, facilitator 400 or some evaluator of the design, believes it will be to produce a software program or component that meets the requirements of the selected design. Like the difficulty levels assigned to the specification, the difficulty level assigned to a design may, in some cases, also factor in the effort believed to be necessary to complete the task, and the time allotted to complete the task. In some embodiments, the recognition awarded to the designer (e.g., money, skill rating, etc.) that submits the selected design may be adjusted based in part on the difficulty level associated with the specification.

In some embodiments, in addition to reviewing the submissions, the design review board can identify useful modifications to the design that should be included into the design prior to entering the development phase. The primary review board member documents the additional requirements, and communicates this information to the designer 404 who submitted the design. In one embodiment, the primary review board member aggregates the comments from the review board. The developer 404 can update the design and resubmit it for review by the design review board. This process can repeat until the primary review board member believes the design has met all the necessary requirements.

Once the design review board validates that a design has sufficiently addressed the requirements of the specification, the primary review board member notifies the facilitator 400, product manager, or external entity that such a design has passed the design review process. The design can then be posted and/or distributed (STEP 422) to the community of developers 407 to solicit submissions for software programs that conform to the design. For example, the facilitator 400 can make the design available on a web site and/or a mailing list for implementation, and request components according to the design.

In one alternative embodiment, and as an example of the flexibility of the system, the entity develops the software design and provides the design to the facilitator 400 as input directly into the development process. The facilitator 400 receives the design (STEP 424) and optionally initiates a review process as described above to confirm that the design meets the standards of the structured development methodology 220. Using this approach, an entity wishing to maintain control of the design phase of the software development process (e.g., architecture, platform, coding standards, etc.) can utilize internal or other resources such as business and systems analysts to develop a design that complies with their standards, and then utilize a distributed community of developers 212 to develop the end product. Generally, this alternative maintains the design aspects of the software development process in-house, and "outsources" the manufacturing aspects of the development process such that the development domain 204 can use repeatable, structured development methods and the community of developers 212 to develop the software programs. Similarly, the entity 208 may only require the services of the development domain 204 to develop a software design, and subsequently use other resources such as in house programmers or off shore developers to develop the code.

The flexibility provided by maintaining multiple entry and exit points into and out of the development process allows external entities to decide, on a case by case or phase by phase basis whether to utilize the development domain 204 from start to finish, (i.e., specification through testing and support) or only use the domain 204 for specific phases of the process (i.e., development of code, development of a specification, development of a software design, testing, support, etc.).

Referring still to FIG. 4, the selected and approved design is posted or provided to members of the distributed community of programmers 212. As above, with the specification, the design may be sent to the entire community or only selected members of the community. In versions where the design is sent to selected members, the selection process can be based on any or a combination of suitable criteria, for example, without limitation, past performances in programming competitions, the quality of previously submitted software programs, involvement in the development of the design, or by specific request of the facilitator 400, entity 208, the designer that submitted the winning design, other designers, or other members of the community 212. In some embodiments, the communication of the design can be accompanied by an indication of a prize, payment, or other recognition that is available to the developer that submits a selected software program, and/or runners up. In some cases, the amount and/or type of payment may change over time, or as the number of participants increases or decreases.

Each developer 404 develops software code (STEPS 426, 426', and 426") meeting the requirements of the selected design, and when completed, submits the code for example to the facilitator 400 or the server. As described above, the developers 404 may use a variety of coding techniques, languages, and development environments to develop the software, so long as the code meets, for example, the functional and architectural aspects dictated by the design and the quality and syntactical standards outlined by the structured development methodology 220. In some embodiments, the developers 404 may use the software development software 224 provided via the communication server 216 to assist with the development tasks. Because the development software 224 and development methodology 220 are both maintained within the development domain 204, many of the coding and quality control requirements of the methodology 220 can be built into the software 224, further assisting the developers 404 to develop quality code in an efficient manner.

To determine which software program will ultimately be selected as the program to be delivered to the entity 208, a code review process (STEP 428) is used, which can take place in any suitable manner. The code review process, in some embodiments, includes one or more developers 404 acting as a code review board to review submitted software programs from software developers. The code review board preferably has a small number of members (e.g., less than ten), for example, three members, but can be any number. Generally, the code review board is formed for only one or a small number of related projects, for example three projects, and then disbanded to allow the members to participate in additional design review boards, code review boards, or participate as designers and/or developers themselves. Review boards, in some embodiments, could be formed for an extended time, but changes in staffing also can help maintain quality.

Preferably, one member of the code review board members is selected as the primary code reviewer by the facilitator 404 and/or the project manager, the members of the review board, and/or the external entity requesting the software program. In some cases, the facilitator 400 or a representative of the facilitator 400 acts as the primary code board member. The primary code board member is responsible for coordination and management of the activities of the board.

In one embodiment, submissions of software programs are judged by the code review board. In some embodiments, the primary review board member screens the code submissions before they are reviewed by the other members of the code review board, to allow the rest of the code board to judge only the best of the submissions, for example, those that meet minimal requirements. In some embodiments, the screening process includes scoring the submissions based on the degree to which they meet formal requirements outlined in the selected design (e.g., format and elements submitted). In some embodiments, scores are documented using a scorecard, which can be a document, spreadsheet, online form, database, or other electronic document.

In one embodiment, for example, with regard to software code, the code reviewer scores the code based on the extent to which: (1) the submitted code addresses the functionality as detailed in component design documents; (2) the submitted code correctly uses all required technologies (e.g. language, required components, etc.) and packages; (3) the submitted code properly implements required algorithms; (4) the submitted code has correctly implemented (and not modified) the public application programming interface (API) as defined in the design, with no additional public classes, methods, or variables.

With regard to the source code, for example, the screening review can determine any or all of that: (1) all public methods are clearly commented; (2) required tags such as "@author," "@param," "@return," "@throws," and "@version" are included; (3) the copyright tag is populated; (4) the source code follows standard coding conventions for the Java language such as those published by Sun Microsystems; (5) a 4 space indentation is used in lieu of a tab indentation; and (6) all class, method and variable definitions found in the class diagram are accurately represented in the source code. The code review can also, for example, verify that unit test cases exist for all public methods in the design, and each unit test is properly identified by a testing program.

With regard to class definitions, for example, the reviewer can evaluate the code based on the extent to which classes are implemented as defined in design documents (including, for example, modifiers, types, and naming conventions), and whether defined classes are implemented. With regard to variable definitions and method definitions, for example, the reviewer can determine the extent to which all variables and methods are implemented as defined in the design documents (including, for example, modifiers, types, and naming conventions). With regard to relationships, for example, the reviewer can determine the extent to which the implementation properly maps class relationships.

The reviewer can further evaluate code based on a code inspection. For example, the reviewer can determine the extent to which the object types defined in the code are the best choices for the intended usage—for example whether a Vector type should have been used instead of an Array type. The reviewer can determine the extent to which there are any needless loops, or careless object instantiation or variable assignment.

The review can also inspect the test cases. With regard to test cases, for example, the reviewer can determine the extent to which (1) the unit test cases thoroughly test all methods and constructors; (2) the unit test cases properly make use of setup and teardown methods to configure the test environment; (3) files used in unit test cases exist in the designated directory; (4) unit test cases do not leave temporary files on the file system after testing is complete.

The reviewer can run tests on the code using test cases, for example test cases developed by the developer 404, other developers, the reviewers, the facilitator 400, the entity 208, as well as others. The reviewer can even further score the code by conducting accuracy, failure, and stress tests. Accuracy tests test the accuracy of the resulting output when provided valid input. Accuracy tests can also validate configuration data. Failure tests test for correct failure behavior when the component is provided with invalid input, such as bad data and incorrect usage. Stress tests test the component capacity for high-volume operation, but testing such characteristics as performance as throughput. The tests that fail are included in the evaluation of the component, for example as a score reduction. The reviewer can then assign an overall score to the component based on this evaluation.

In one embodiment, the primary review board member informs the code review board that one or more submissions have passed the initial screening step (STEP 430), and the code review board can then evaluate the program submissions in greater detail. In some embodiments, the code review board can review the submissions based on design requirements documented in the selected design. The code review board can then score the submissions (STEP 432) based on the results of the evaluations. In some embodiments, the scores are documented using a scorecard, which can be any suitable means, such as a document, spreadsheet, online form, database, or other electronic document.

In some embodiments, the scores and reviews from the primary code board member and the other members of the code review board are aggregated into a final review and score. In some embodiments, aggregation can comprise compiling information contained in one or more documents. Such aggregation can be performed by the facilitator 400, the primary code board member, the other members of the code review board or in one exemplary embodiment, the aggregation is performed using a computer-based system which resides on the server 104 (FIG. 1). In some embodiments, the facilitator 400 or the primary review board member resolves discrepancies or disagreements among the members of the code review board.

In one embodiment, the software program with the highest combined score is selected as the winning program (STEP 434) that will be delivered to the external entity 208 as a finished product (STEP 436). In some embodiments, a prize, payment and/or recognition is given to the software developer that submitted the winning program. There can also be prizes, payments, and/or recognition for the other submitted programs. For example, the programmers that submit the second and third best programs may also receive payment, which in some cases may be less than that of the winning programmer. Payments may also be made for creative use of technology, submitting a unique test case, or other such submissions. In some embodiments, the software developers can contest the score assigned to their programs, test cases, or other submissions.

In some embodiments, in addition to reviewing the submissions, the code review board can identify useful modifications to the program that should be included into a selected software program prior to distribution. The primary code review board member documents the additional requirements, and communicates this information to the developer 404 who submitted the code. In one embodiment, the primary code review board member aggregates the comments from the review board. The developer 404 can update the program and resubmit it for review by the code review board. This process can repeat until the primary review board member believes the program has met all the necessary requirements and meets the standards specified in the structured development methodology 220.

In some embodiments, the software may be updated with enhancements, post-delivery bug fixes, additional functionality, or modified to operate in additional computing environments or platforms after it has been delivered to one or more entity 208. In such cases, the domain 204 provides for the tracking and updating (STEP 438) of previously distributed software products, as described in co-pending U.S. patent application Ser. No. 10/408,402, entitled "Method and Systems for Software Development" by Hughes, filed on Apr. 7, 2003, and incorporated by reference in its entirety herein.

For example, in one embodiment, an entity commissions the development of a software component, and upon completion of the component, version 1 of the component is distributed to the entity 208. Subsequently, a second entity 208 requests the development of a similar component that performs the same functionality, however to meet the specific request of the second entity, some modifications are made to the component. A modification is, for example, an improvement (e.g., efficiency increase, smaller memory requirements), deletion (e.g., of an unneeded step or feature), and an addition (e.g., of a complimentary feature or function) to the component. Another example of a modification is the integration of the component into another component (e.g., a larger component). In response to the request for the modified component, a new version of the component (version 1.1, for example) is developed and distributed to the second entity 208. In one embodiment, a message is sent to the first entity 208 stating that an updated version of the component is available. In further embodiments, the costs for developing the newer version of the component can be shared among the recipients of the original component (version 1) who wish to receive the new version, as well as the entity that initiated the development of the new version. Additionally, in some embodiments the entity 208 that requested the development of the new version is compensated for licenses/sales of copies of the second version of the component.

As mentioned above, in some embodiments, the developers 404 submit one or more test cases in addition to submitting the completed software program. The purpose of the test cases is to provide sample data and expected outputs against which the program can run, and the actual output of which can be compared to the expected outputs. By submitting multiple test cases, many different scenarios can be tested in isolation, therefore specific processing errors or omissions can be identified. For example, a program that calculates amortization tables for loans may require input data such as an interest rate, a principal amount, a payment horizon, and a payment frequency. Each data element may need to be checked such that null sets, zeros, negative numbers, decimals, special characters, etc. are all accounted for and the appropriate error checking and messages are invoked. In addition, the mathematical calculations should be verified and extreme input values such as long payment periods, daily payments, very large or very small principal amounts, and fractional interest rates should also be verified. In some versions, one test case can be developed to check each of these cases, however in other versions, it may be beneficial to provide individual test cases for each type of error. In certain embodiments, the multiple test cases can then be incorporated into a larger test program (e.g., a script, shell, or other high level program) and run concurrently or simultaneously.

In general, developers are encouraged to develop test cases as they are coding so that they can consider the bounding and error conditions as they code. It can be beneficial to use the test cases developed by one or more, or all, of the other submitters to test each of the submitted programs to cover as many error conditions as possible.

Figure 5:
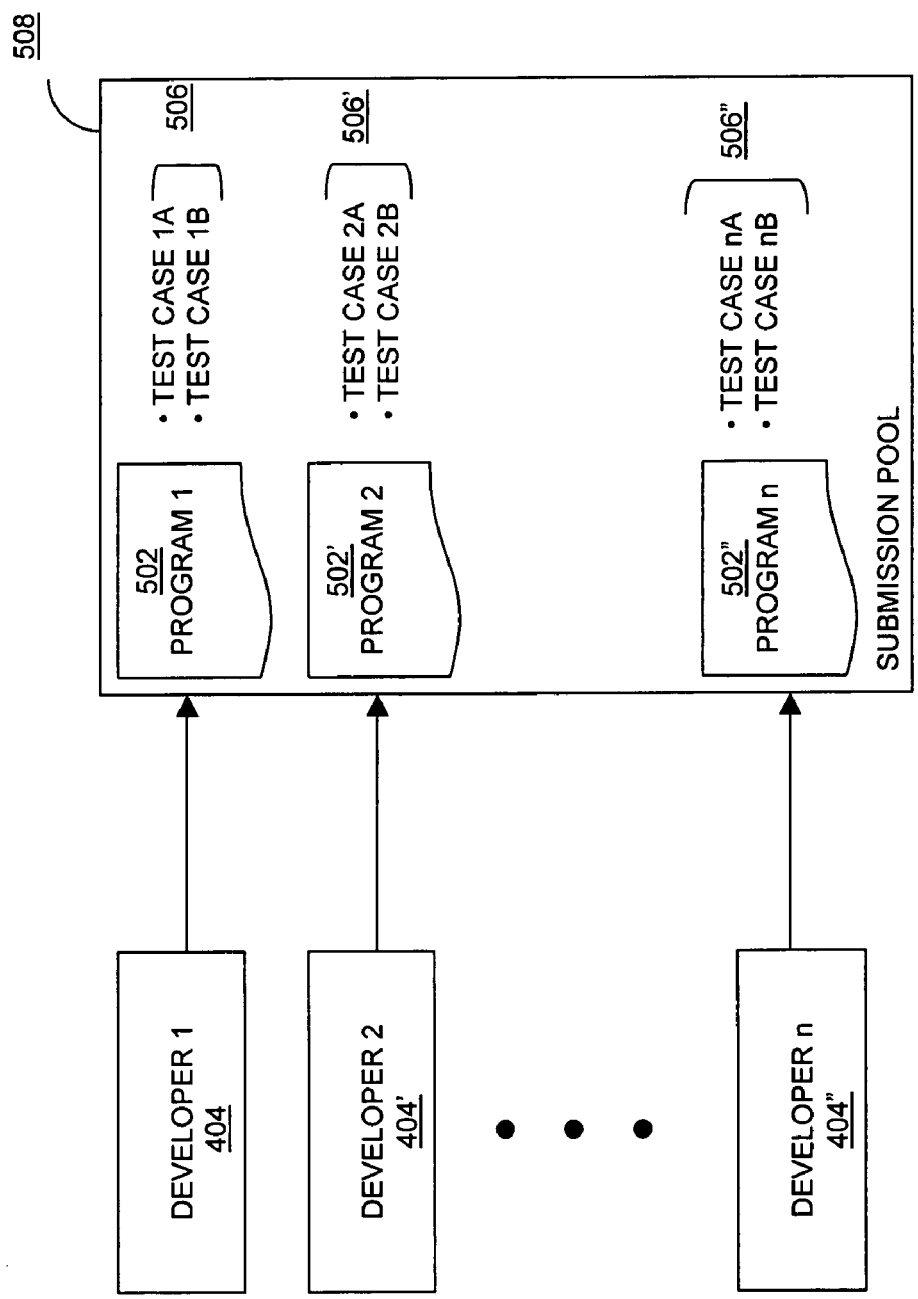
FIG. 5 is a block diagram depicting a software testing environment created with multiple submissions of test cases according to an embodiment of the invention.

Referring to FIG. 5, in a demonstrative embodiment, developers 404, 404' and 404" each submit software programs 502, 502' and 502" respectively to the development domain 204 in response to the communicated software design and/or specification referred to above. In addition to submitting the programs, the developers 404 also submit one or more test cases 506, 506', and 506". For example, when DEVELOPER 1 404 submits PROGRAM 1 502, she also submits TEST CASE 1A and TEST CASE 1B, collectively 506. DEVELOPER 2 404' and DEVELOPER 3 404" do the same, such that after all three developers 404 have completed their submission, the development domain 204 includes a submission pool 508 comprising three submitted programs and six test cases. Even though it is likely that DEVELOPER 1 404 ran TEST CASE 1A and 1B 506 that she submitted against her PROGRAM 502, it is also possible that the test cases 506' and 506" submitted by DEVELOPER 2 404' and DEVELOPER 3 404" respectively address cases or data not contemplated by DEVELOPER 1 404. Therefore, it can be advantageous to run each test case submitted by all of the developers against each of the submitted programs in an attempt to identify all potential faults of each submitted program. In some versions, a subset of the submitted test cases may be eliminated from the submission pool 508, or not used, for example, because they are duplicative, do not test necessary features, or are incorrect. If so, a subset of the test cases in the submission pool 508 can be used to test the submitted programs. Because the programs are tested more rigorously (i.e., using a suite of test cases submitted by numerous developers) the quality of the resulting programs is likely to be greater than that of programs tested only by those that developed the selected program.

Referring to FIG. 6, the test cases in the submission pool 508 are applied to the submitted programs 502, 502', 502". In some cases, all of the test cases in the pool 508 are applied to every submitted program, whereas in some versions only a subset of the submitted test cases are used. In some embodiments, certain programs may be eliminated from contention by running a first test case against it, such that subsequent test cases are not necessary. In some versions, each application of test case to a program results in a score 604. The scores 604 for each application of test case to submitted program can then be tabulated and aggregated into a combined, or overall score for that particular program. Some test cases have a higher or lower weight than others such that the scores for a particular test case may be more indicative of the overall quality of the program, or the results are more meaningful. In other cases, the scores may be binary—i.e., a passed test receives a score of "1" and a failed test receives a score of "0." In some embodiments the tabulation and aggregation can be automated on the server 104.

In some embodiments, developers that submit designs and/or developed code are rated based on the scores of their submissions. The ratings are calculated based on the ratings of each developer prior to the submission, the assigned difficulty level of the design or program being submitted, and the number of other developers making submissions. It should be understood that a submission could be one design, program, or other computer software asset, or in some cases a number of different assets. A skill rating is calculated for each developer based on each developer's rating prior to the submission and a constant standard rating (e.g., 1200), and a deviation is calculated for each developer based on their volatility and the standard rating.

The expected performance of each developer submitting a design or program is calculated by estimating the expected score of that developer's submission against the submissions of the other developers' submissions, and ranking the expected performances of each developer. The submission can be scored by an reviewer using any number of methods, including, without limitation, those described above.

Based on the score of the submitted software and the scores of submissions from other developers (e.g., whether for the same program or one or more other programs having a similar level of difficulty), each developer is ranked, and an actual performance is calculated based on their rank for the current submission and the rankings of the other developers. In some cases, the submissions from other developers used for comparison are for the same program. In some cases, the submissions from other developers are submissions that are of similar difficulty or scope.

A competition factor also can be calculated from the number of developers, each developer's rating prior to the submission of the design or program, the average rating of the developers prior the submissions, and the volatility of each developer's rating prior to submission.

Each developer can then have their performance rated, using their old rating, the competition factor, and the difference between their actual score and an expected score. This performance rating can be weighted based on the number of previous submissions received from the developer, and can be used to calculate a developer's new rating and volatility. In some cases, the impact that a developer's performance on one submission may be capped such that any one submission does not have an overly significant effect on a developer's rating. In some cases, a developer's score may be capped at a maximum, so that there is a maximum possible rating. The expected project performance of each developer is calculated by estimating the expected performance of that developer against other developers and ranking the expected performances of each participant. The submissions and participants can be scored by the facilitator 400, the entity 208, a review board member, or automatically using the software residing, for example, on the server 104 using any number of methods.

One such example of scoring methodology is described in U.S. Pat. No. 6,569,012, entitled "Systems and Methods for Coding Competitions" by Lydon et al, at, for example, column 15 line 39 through column 16 line 52, and column 18 line 65 through column 21 line 51, and incorporated by reference in their entirety herein. The methodology is described there with reference to programming competitions, and so is applicable to rating the development of software or hardware designs, data models, applications, components, and other work products created as a result of using the methodology described above.

In one embodiment, the external entity 208 is interested in receiving the developed design or the code, as well as obtaining developers' ratings, and in some cases only the ratings. For example, the external entity 208 may ask developers to participate in the development process just so that the developers are rated, and their skills can be objectively evaluated for future projects of greater value, or to determine which developers are more skilled. The requestor could, in addition, have some interest in the developed design or code, and may have some interest in using the developed intellectual asset for its business or otherwise.

There can be a significant benefit to using personnel who are rated highly, using the process described above, as design reviewer(s) in the design review process and/or code reviewer(s) in the code review process. One of the traditional problems with conducting code reviews has been that the abilities of the reviewers were not established. Review by a poorly skilled developer can result in an inadequate review. By using the process to select as reviewers only developers with sufficient skill (as determined by the process), the process itself insures its success.

In one embodiment, this software development process is adopted by a software development group within an organization. The development performed by the group is conducted using this process. Each developer in the group has a rating, and the developers work to improve and/or maintain their ratings. Developers who have high ratings can participate in reviews (e.g., the design review process or the code review process). In one implementation, developers receive additional benefits and or compensation for achieving a high rating. Likewise, developers can receive additional benefits and/or compensation for such participation in a review process. The requestors in this example are product or program managers, charged with directing the software development.

In another implementation, an outside organization such as a consultant can use the system and methods described above to evaluate and rate the development competencies of a development group. In this way, the consultant can rate the developers not only against themselves, but against other developers affiliated with other organizations who have participated or are participating in the system. The evaluator provides the service of evaluation and reporting as described above. One benefit to this approach is that the scoring of the intellectual assets are more likely to be unbiased if the reviewers are not personally known to the developers, and comparing the skills of any one developer against a large pool of developers provides a more accurate representation of that developers skill level with respect to his or her peers.

Figure 7:
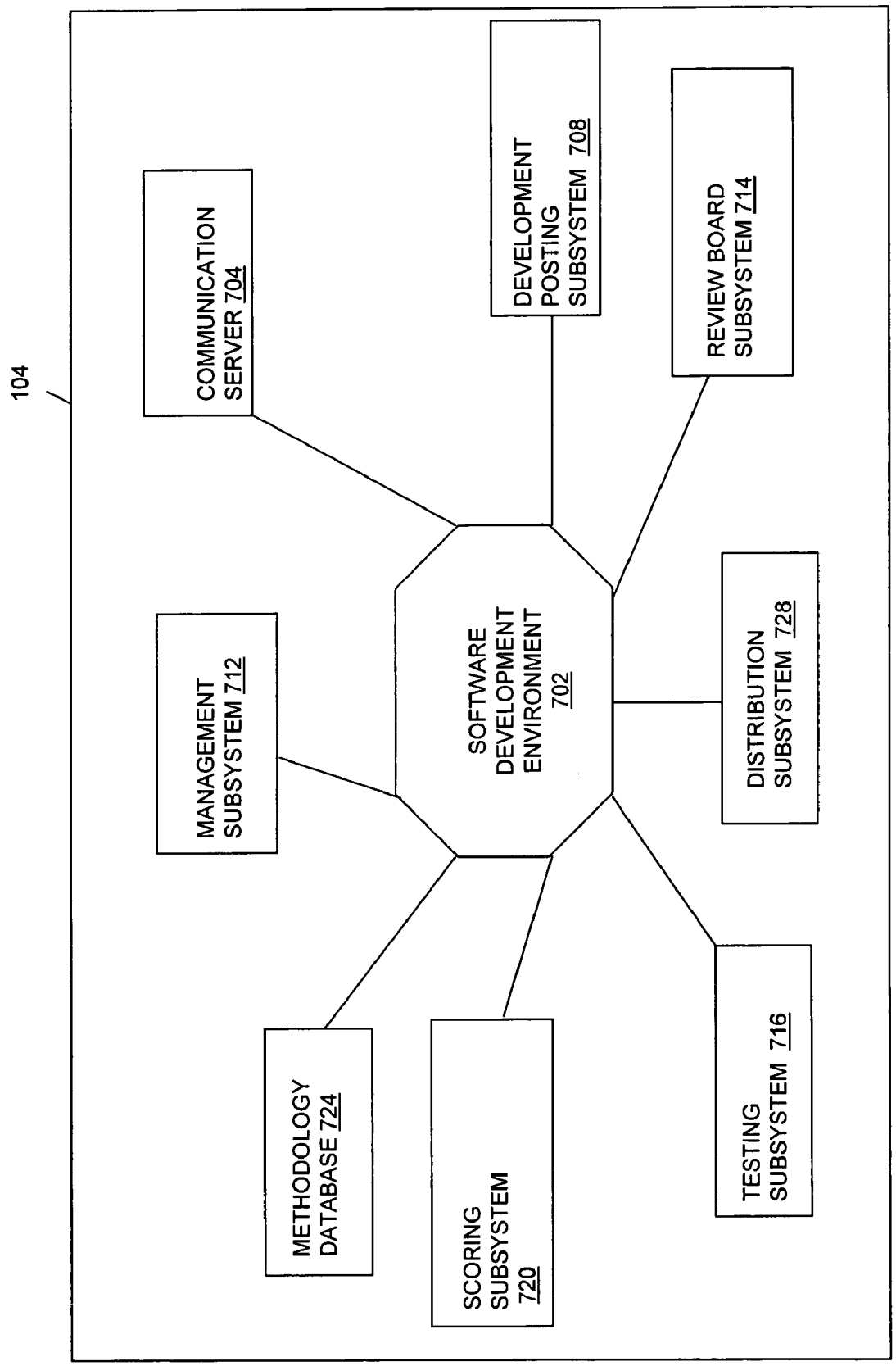
FIG. 7 is a block diagram of an embodiment of a server such as that of FIG. 1 to facilitate the development and/or testing of software programs.

Referring to FIG. 7, the server 104 can include a number of modules and subsystems to facilitate the communication and development of software specifications, designs and programs. The server 104 includes a communication server 704. One example of a communication server 704 is a web server that facilitates HTTP/HTTPS and other similar network communications over the network 112, as described above. The communication server 704 includes tools that facilitate communication among the distributed community of programmers 212, the external entity 208, the facilitator 400, and the members of the review board(s) (commonly referred to as "users"). Examples of the communication tools include, but are not limited to, a module enabling the real-time communication among the developers 404 (e.g., chat), news groups, on-line meetings, and document collaboration tools. The facilitator 400 and/or the external entity 208 can also use the communication server 704 to post design or specifications for distribution to the distributed community of programmers 212.

Furthermore, the server 104 also includes a software development environment 702 to facilitate the software development domain 204 and the design and development process, for example, and the subsystems and modules that support the domain 204. For example, the server 104 can include a development posting subsystem 708, a management subsystem 712, a review board subsystem 714, a testing subsystem 716, a scoring subsystem 720, a methodology database 724, and a distribution subsystem 728.

In one embodiment, the development posting subsystem 708 allows users of the system to post specifications, submit designs, post selected designs, submit software programs and test cases, and post selected software programs for distribution. The posting subsystem 708 identifies the users based on their role or roles, and determines which functions can be accessed based on individual security and access rights, the development phase that a project is currently in, etc. For example, if a particular project is in the design development phase, the posting subsystem 708 can determine that the external entity sponsoring the project has read/write access to the specification, and can re-post an updated specification if necessary. The facilitator 400 may have read access to the specification, as well as access to other specifications attributed to other external entities they may support. In some embodiments, the entire distributed community of programmers may be able to view all of the currently pending specifications, however the posting subsystem may limit full read access to only those developers meeting one or more skill or rating criteria, as described above. Once designs are submitted, access to the submitted designs can be further limited to only review board members, or in some cases other participants in the process.

The development posting subsystem 708 also enables the server 104 or other participants to communicate with potential developers to promote development projects and grow the community of programmers that participate in the development process. In one embodiment, the development posting subsystem 708 displays an advertisement to potential developers. In one embodiment, the advertisement describes the project using text, graphics, video, and/or sounds. Examples of communication techniques include, without limitation, posting these ads on the server's web site, displaying statistics about the project (e.g., planned royalties paid to developers, developers who are participating in this project, development hours available per week). Moreover, in one embodiment the development posting subsystem 708 accepts inquiries associated with development projects. In further embodiments, the development posting subsystem 708 suggests development opportunities to particular developers. The development posting subsystem 708 may analyze, for example, the rating of each member of the distributed community, previous contributions to previous development projects, the quality of contributions to previous component development projects (e.g., based on a score given to each developer's submission(s) as discussed above), and current availability of the developer to participate.

The server 104 also includes a management subsystem 712. The management subsystem 712 is a module that tracks the progress of design and development projects using the software development environment 204. The management subsystem 712 also facilitates the enrollment of new users of the system, and assigns the appropriate security and access rights to the users depending on the roles they have on the various projects. In some versions, the management subsystem 712 can also compile and track operational statistics of the software development environment 204 and users of the system. For example, to determine the appropriate compensation to be awarded to a developer submitting a wining design, the management subsystem 712 may review previously completed projects and assign a similar cash award. Similarly, in cases where the difficulty level of a posted design or program is very high, the management subsystem 712 can review information about individual programmers to determine those developers who have historically performed well on like projects. In addition, the management subsystem 712 may be used to analyze overall throughput times necessary to develop operational programs from a specification provided by an external entity. This can assist users of the system in setting the appropriate deliverable dates and costs associated with new projects.

The server 104 also includes a review board subsystem 714. The review board subsystem 714 allows review board members, external entities, the facilitator, and in some cases developers in the distributed community to review submissions from other developers, as described above. In one embodiment, the communication server 704, the development posting subsystem 708, the management subsystem 712, the review board subsystem 714, the testing subsystem, the scoring subsystem, and the methodology database reside on the server 104. Alternatively, these components of the software development environment 204 can reside on other servers or remote devices.

The server 104 additionally includes a testing subsystem 716. The testing subsystem 716 enables the testing of the submitted programs, applications and/or components. In one embodiment, the testing server 708 is used by the review boards, the facilitator 400, and/or the external entity 208 to review, evaluate, screen and test submitted designs and software programs. The testing subsystem 716 can also execute test cases developed and submitted by the developer 404 against some or all of the submitted programs, as described above. Moreover, the testing subsystem 716 may execute an automated test on the component or application, such as to verify and/or measure memory usage, thread usage, machine statistics such as I/O usage and processor load. Additionally, the testing subsystem 716 can score the component by performance, design, and/or functionality. The testing subsystem 716 can be a test harness for testing multiple programs simultaneously.

The server 104 also includes a scoring subsystem 720. In one embodiment, the scoring subsystem 720 calculates scores for the submissions based on the results from the testing subsystem 716, and in some embodiments ratings for each participant in one or more coding competitions, previous development submissions, or both. In other embodiments, the scoring subsystem 720 can calculate ratings for developers based on their contributions to the project.

The server 104 also includes a methodology database 724. The methodology database 724 stores data relating to the structured development methodology 220. In one embodiment, the methodology 220 may stipulate specific inputs and outputs that are necessary to transition from one phase of the development project to the next. For example, the methodology 200 may dictate that, in order to complete the specification phase of the project and being the design phase, a checklist of items must be completed. Furthermore, the methodology database 724 may store sample documents, designs, and code examples that can be used as templates for future projects, and thus impose a standardized, repeatable and predictable process framework on new projects. This standardization reduces the risks associated with embarking on new software development projects, shortens the overall duration of new development projects, and increases the quality and reliability of the end products.

The server 104 also includes distribution subsystem 728. The distribution subsystem 728 can track and store data relating to software products (e.g., specifications, designs, developed programs) that have been produced using the domain 204. In one embodiment, the distribution subsystem 728 includes descriptive information about the entity 208 that requested the product, the entry and exit points of the domain 204, significant dates such as the request date, and the delivery date, the names and/or nicknames of the developers that participated in the development of the product. The distribution subsystem 728 can also include detailed functional information about the product such as technology used to develop the product, supported computing environments, as well as others. In some embodiments, previously distributed software products may be updated or patched, as described above. In such cases, the distribution subsystem 728 facilitates the identification of the entity or entities 208 that may have older versions of the product, and subsequent communication and distribution of updated versions, where applicable. In some cases, the distribution subsystem 728 can also function as a source code management system, thereby allowing various versions of previously developed software products to branch into distinct software products having a common provenance.

Although described above as independent subsystems and modules, this is for exemplary purposes only and these subsystems and modules may alternatively be combined into one or more modules or subsystems. Moreover, one or more of the subsystems described above may be remotely located from other modules (e.g., executing on another server 104 in a server farm).

Although described here with reference to software, and useful when implemented with regard to software components, the cooperatively developed product can be any sort of tangible or intangible object that embodies intellectual property. As non-limiting examples, the techniques could be used for computer hardware and electronics designs, or other designs such as architecture, construction, or landscape design. Other non-limiting examples for which the techniques could be used include the development of all kinds of written documents and content such as documentation and articles for papers or periodicals (whether on-line or on paper), research papers, scripts, multimedia content, legal documents, and more.

What is claimed is:

1. A computerized system for developing software programs by conducting competitions using a communications server and a review board subsystem, the system comprising:
   a communications server for communicating as part of a first competition for a design of a software program a specification for the design of a software program to a first plurality of developers and for receiving from each of a subset of the first plurality of software developers, in response to the communicated specification, respective designs for the software program;
   a review board subsystem for facilitating a design review process for scoring each of the received designs using an electronic document scorecard and selecting one design from the received designs based at least in part on its score in the design review process;
   and wherein the communications server is also for communicating the selected design to a second plurality of software developers as part of a second competition for development of the software program designed in the first competition and receiving from each of a subset of the second plurality of software developers, in response to the communicated design, respective software programs;
   and wherein the review board subsystem is also for facilitating a software review process for scoring each of the received programs using an electronic document scorecard; and selecting one program from the received programs based at least in part on its score in the software review process.

2. The system of claim 1 wherein the software program comprises a component, an application, a module, or a library.

3. The system of claim 1 wherein each of the first plurality of software developers were rated in one or more coding competitions.

4. The system of claim 1 wherein the first plurality of developers are rated at least in part based on the score associated with their respective designs.

5. The system of claim 1 wherein the first plurality of developers and second plurality of software developers are geographically distributed.

6. The system of claim 1 where the first plurality of developers and the second plurality of developers comprise a different population of developers.

7. The system of claim 1 wherein the software program design comprises one or more design elements selected from the set of design elements comprising a requirements document, an activity diagram, a case document, test cases, a prototype, and a UML document; and wherein the required design elements are specified in the specification for the design of the software program.

8. The system of claim 1 further comprising a management subsystem for rewarding the software developer that submitted the selected design.

9. The system of claim 8 wherein the reward is monetary.

10. The system of claim 1 further comprising a management subsystem for rewarding the software developer that submitted the selected program.

11. The system of claim 10 wherein the reward is monetary.

12. The system of claim 1 further comprising, a development posting subsystem for, prior to communicating the specification, receiving at least a portion of the specification from an entity requesting the development of the software program.

13. The system of claim 1 wherein the design review process is performed by a plurality of reviewers.

14. The system of claim 13 wherein each of the plurality of reviewers were rated in a competition.

15. The system of claim 14 wherein the ratings of each of the plurality of reviewers are above a predetermined minimum rating.

16. The system of claim 13 wherein the design review process comprises aggregating scores from each of the plurality of reviewers into a summary score for each submitted design and the selection of one design is based on the summary scores.

17. The system of claim 16 wherein the software review process comprises aggregating scores from each of the plurality of reviewers into a summary score for each submitted program and the selection of one program is based on the summary scores.

18. The system of claim 1 wherein the software review process is performed by a plurality of reviewers.

19. The system of claim 18 wherein each of the plurality of reviewers were rated in a computer programming competition.

20. The system of claim 19 wherein the ratings of each of the plurality of reviewers are above a predetermined minimum rating.

21. The system of claim 1 wherein the facilitated design review comprises reading submitted design documents, completing a review scorecard, and identifying changes to be incorporated into the design by the software developer who submitted the design.

22. The system of claim 21 wherein the review scorecard comprises an on-line form.

23. The system of claim 21 wherein the identified changes are designated as either mandatory or optional.

24. The system of claim 1 wherein the received program comprises one or more of source code, object code, and compiled code.

25. The system of claim 1 further comprising a distribution subsystem for distributing the selected program.

26. The system of claim 25 wherein the distribution subsystem further provides support updates for the distributed software program.

27. The system of claim 1 wherein the review board subsystem further facilitates receiving an appeal from a developer contesting the score assigned to the developer's design.

28. The system of claim 1 wherein the review board subsystem further facilitates receiving an appeal from a developer contesting the score assigned to the developer's program.

* * * * *